(12) United States Patent
Hirschler et al.

(10) Patent No.: US 10,170,746 B2
(45) Date of Patent: Jan. 1, 2019

(54) BATTERY ELECTRODE, BATTERY, AND METHOD FOR MANUFACTURING A BATTERY ELECTRODE

(71) Applicant: Infineon Technologies AG, Neubiberg (DE)

(72) Inventors: Joachim Hirschler, Villach (AT);
Magdalena Forster, Villach (AT);
Michael Sorger, Villach (AT);
Katharina Schmut, Villach (AT);
Bernhard Goller, Villach (AT);
Philemon Schweizer, Feffernitz (AT);
Michael Sternad, Graz (AT); Thomas Walter, Treffen (AT)

(73) Assignee: Infineon Technologies AG, Neubiberg (DE)

( * ) Notice: Subject to any disclaimer, the term of this patent is extended or adjusted under 35 U.S.C. 154(b) by 229 days.

(21) Appl. No.: 13/653,493

(22) Filed: Oct. 17, 2012

(65) Prior Publication Data

US 2014/0106229 A1    Apr. 17, 2014

(51) Int. Cl.

| | | |
|---|---|---|
| H01M 4/13 | (2010.01) | |
| H01M 4/134 | (2010.01) | |
| H01M 4/04 | (2006.01) | |
| H01M 4/1395 | (2010.01) | |
| H01M 4/38 | (2006.01) | |
| H01M 10/052 | (2010.01) | |

(Continued)

(52) U.S. Cl.
CPC .............. *H01M 4/04* (2013.01); *H01M 4/13* (2013.01); *H01M 4/134* (2013.01); *H01M 4/1395* (2013.01); *H01M 4/386* (2013.01); *H01M 10/052* (2013.01); *H01M 10/054* (2013.01); *H01M 2004/021* (2013.01)

(58) Field of Classification Search
USPC ......... 429/231.8, 211, 223; 257/24; 438/478
See application file for complete search history.

(56) References Cited

U.S. PATENT DOCUMENTS

| | | | | |
|---|---|---|---|---|
| 3,041,213 A | * | 6/1962 | Anderson et al. | ............. 257/586 |
| 4,136,436 A | * | 1/1979 | Kilby | ....................... C25B 1/003 |
| | | | | 136/250 |

(Continued)

FOREIGN PATENT DOCUMENTS

CN    1638172 A    7/2005

OTHER PUBLICATIONS

Voigt et al., Geometrical optimization and contact configuration in radial pn junction silicon nanorod andmicrorod solar cells, Prog. Photovolt: Res. Appl. 2013; 21:1567-1579.*

(Continued)

*Primary Examiner* — Ula C Ruddock
*Assistant Examiner* — Anna Korovina
(74) *Attorney, Agent, or Firm* — Viering, Jentschura & Partner MBB

(57) ABSTRACT

A battery electrode in accordance with various embodiments may include: a substrate including a surface configured to face an ion-carrying electrolyte; and a first diffusivity changing region at a first portion of the surface, wherein the first diffusivity changing region is configured to change diffusion of ions carried by the electrolyte into the substrate, and wherein a second portion of the surface is free from the first diffusivity changing region.

24 Claims, 21 Drawing Sheets

(51) Int. Cl.
*H01M 10/054* (2010.01)
*H01M 4/02* (2006.01)

(56) References Cited

U.S. PATENT DOCUMENTS

| | | | | |
|---|---|---|---|---|
| 5,258,077 | A * | 11/1993 | Shahryar | 136/256 |
| 5,521,105 | A * | 5/1996 | Hsu et al. | 438/197 |
| 6,703,672 | B1 * | 3/2004 | Brigham | H01L 21/0276 257/407 |
| 7,618,678 | B2 | 11/2009 | Mao et al. | |
| 2005/0136330 | A1 | 6/2005 | Mao et al. | |
| 2005/0142447 | A1 * | 6/2005 | Nakai et al. | 429/231.95 |
| 2006/0097691 | A1 | 5/2006 | Green | |
| 2009/0061600 | A1 * | 3/2009 | Spurgeon et al. | 438/478 |
| 2009/0130563 | A1 * | 5/2009 | Green | H01M 4/134 429/231.95 |
| 2009/0311601 | A1 * | 12/2009 | Kashiwagi et al. | 429/218.1 |
| 2010/0133509 | A1 * | 6/2010 | Kawashima et al. | 257/24 |
| 2011/0111291 | A1 * | 5/2011 | Koga | 429/209 |
| 2011/0111304 | A1 | 5/2011 | Cui et al. | |
| 2011/0318657 | A1 * | 12/2011 | Ein-Eli | H01M 4/38 429/405 |
| 2012/0121983 | A1 * | 5/2012 | Yoon et al. | 429/220 |
| 2012/0183856 | A1 * | 7/2012 | Cui et al. | 429/223 |
| 2013/0128488 | A1 | 5/2013 | Forster et al. | |
| 2013/0177814 | A1 * | 7/2013 | Rojeski et al. | 429/231.8 |
| 2013/0224583 | A1 * | 8/2013 | Green | 429/211 |

OTHER PUBLICATIONS

Wang et al., The Development of Silicon Nanocomposite Materials for Li-Ion Secondary Batteries, The Open Materials Science Journal, 2011, 5, (Suppl 1: M5) 228-235.*

Wang et al., Ordered arrays of nanoporous silicon nanopillars and silicon nanopillars with nanoporous shells, Nanoscale Research Letters 2013, 8:42.*

Ye et al., Enhanced lithiation and fracture behavior of silicon mesoscale pillars via atomic layer coatings and geometry design, Journal of Power Sources 248 (2014) 447-456.*

Chan et al., High-performance lithium battery anodes using silicon nanowires, nature nanotechnology, vol. 3, Jan. 2008, p. 31-35.*

Chan et al., High Capacity Li Ion Battery Anodes Using Ge Nanowires, Nano Letters, 2008, vol. 8, No. 1, 307-309.*

Li et al., Improved Vertical Silicon Nanowire Based Thermoelectric Power Generator With Polyimide FillingIEEE Electron Device Letters, vol. 33, No. 5, May 2012, p. 715-717.*

Hargrove, Efficient Kinetic Monte Carlo Simulation of Annealing in Semiconductor Materials, Aug. 2003 NPL, 266 pages total.*

Peng at al., "Lithium transport at silicon thin film: Barrier for high-rate capability anode", The Journal of Chemical Physics 133, 034701 (2010); 6 pages total.*

Morrison, Electronic Design, Feb. 6, 2000.*

Salahuddin, Lecture 2, 2011.*

Electrochemical and Solid-State Letters, 6 (5), "Structured Silicon Anodes for Lithium Battery Applications", Green et al. A75-A79, 2003.

* cited by examiner

BATTERY ELECTRODE, BATTERY, AND METHOD FOR MANUFACTURING A BATTERY ELECTRODE

TECHNICAL FIELD

Various embodiments relate to a battery electrode, a battery, and a method for manufacturing a battery electrode.

BACKGROUND

With the increased use of batteries in electronic devices, for example in portable electronic devices (e.g. portable telephones, notebooks), charge storage times and capacity of batteries used in these portable electronic devices have also received increased attention. Capacity of a battery, for example a rechargeable battery such as, for example, a lithium ion secondary battery may be limited by the behavior of a battery electrode (e.g. anode) upon charging the battery. For example, in many cases charging a battery may lead to significant volume expansion of the battery's anode, which may eventually lead to cracking or rupture of the anode. Thus, the amount of charging may be limited by this rupture.

SUMMARY

A battery electrode in accordance with various embodiments may include: a substrate including a surface configured to face an ion-carrying electrolyte; and a first diffusivity changing region at a first portion of the surface, wherein the first diffusivity changing region is configured to change diffusion of ions carried by the electrolyte into the substrate, and wherein a second portion of the surface is free from the first diffusivity changing region.

A battery in accordance with various embodiments may include: an ion-carrying electrolyte; and at least two battery electrodes. At least one battery electrode of the at least two battery electrodes may include: a substrate including a surface facing the ion-carrying electrolyte, and a first diffusivity changing region at a first portion of the surface, wherein the first diffusivity changing region is configured to change diffusion of ions carried by the ion-carrying electrolyte into the substrate, wherein a second portion of the surface is free from the first diffusivity changing region.

A method for manufacturing a battery electrode in accordance with various embodiments may include: providing a substrate including a surface configured to face an ion-carrying electrolyte; forming a first diffusivity changing region at a first portion of the surface, wherein a second portion of the surface remains free from the first diffusivity changing region, and wherein the first diffusivity changing region is configured to change diffusion of ions carried by the electrolyte into the substrate.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
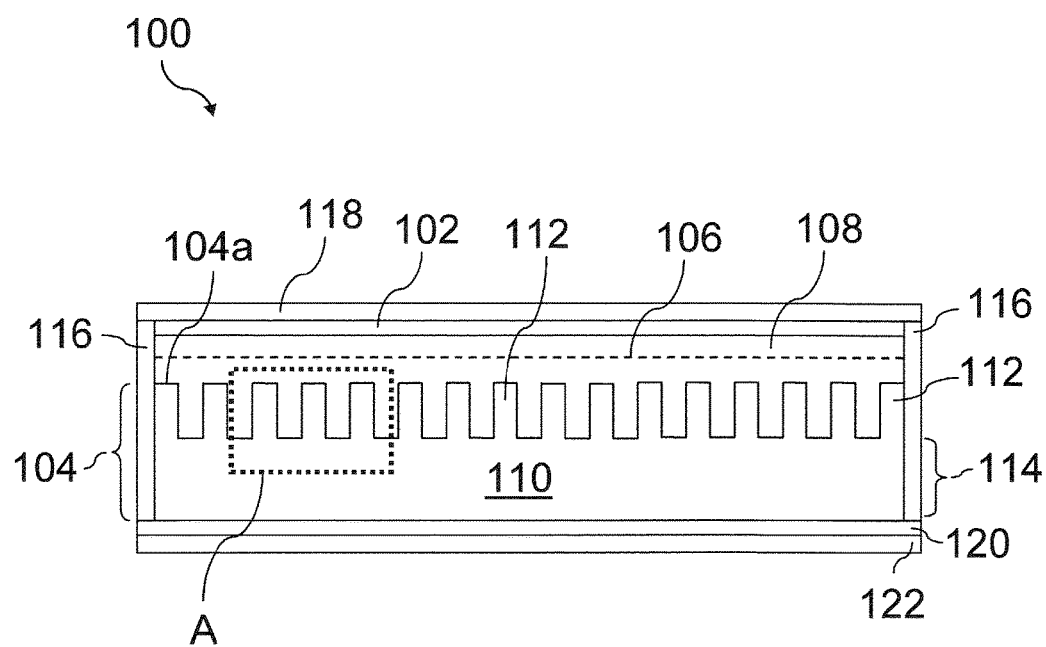
FIG. 1 shows a cross-sectional view illustrating a battery.

The following detailed description refers to the accompanying drawings that show, by way of illustration, specific details and embodiments in which the invention may be practised. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments. Various embodiments are described for structures or devices, and various embodiments are described for methods. It may be understood that one or more (e.g. all) embodiments described in connection with structures or devices may be equally applicable to the methods, and vice versa.

The word "exemplary" is used herein to mean "serving as an example, instance, or illustration". Any embodiment or design described herein as "exemplary" is not necessarily to be construed as preferred or advantageous over other embodiments or designs.

The word "over", used herein to describe forming a feature, e.g. a layer "over" a side or surface, may be used to mean that the feature, e.g. the layer, may be formed "directly on", e.g. in direct contact with, the implied side or surface. The word "over", used herein to describe forming a feature, e.g. a layer "over" a side or surface, may be used to mean that the feature, e.g. the layer, may be formed "indirectly on" the implied side or surface with one or more additional layers being arranged between the implied side or surface and the formed layer.

In like manner, the word "cover", used herein to describe a feature disposed over another, e.g. a layer "covering" a side or surface, may be used to mean that the feature, e.g. the layer, may be disposed over, and in direct contact with, the implied side or surface. The word "cover", used herein to describe a feature disposed over another, e.g. a layer "covering" a side or surface, may be used to mean that the feature, e.g. the layer, may be disposed over, and in indirect contact with, the implied side or surface with one or more additional layers being arranged between the implied side or surface and the covering layer.

The term "region" or "layer" as used herein in connection with the expression "at a surface" or "at a portion of a surface" (of some other element, e.g. of a substrate such as e.g. substrate 310 shown in the figures), for example as used in expressions such as "a first/second diffusivity changing region at a first/second portion of the surface of the substrate", may, for example, include or refer to a region or layer formed at or over the surface (or, at or over a portion of the surface), e.g. a region or layer formed at or over the surface of a substrate, or may, for example, include or refer to a region or layer of the surface itself (or, a region or layer of a portion of the surface), or may, for example, include or refer to a region or layer formed within the other element (e.g. substrate), for example proximate to and/or below the surface (or portion of the surface) of the other element.

With the increased use of batteries in electronic devices, for example in portable electronic devices (e.g. portable telephones, notebooks), charge storage times and capacity of batteries have also received increased attention. Typically, batteries, for example rechargeable batteries (sometimes also referred to as secondary cells or batteries) such as, for example, lithium ion secondary batteries may need to be charged or re-charged when the charge stored in one or more of the battery's electrodes (e.g. anode) is low.

Charging or re-charging a battery may involve the insertion or loading of ions (e.g. lithium ions) into an electrode of the battery (herein also referred to as battery electrode), for example into an anode of the battery. The volume of the battery electrode may increase as ions are inserted into the battery electrode during charging. For example, lithium-ion battery electrodes may include silicon, which may undergo a volume expansion of up to 300% when loaded with lithium ions during charging. This volume expansion may cause stress and/or strain in the material of the battery electrode, which may lead to a rupturing or cracking of a surface of the battery electrode. Accordingly, the charge storing capacity, and/or the charge storage times of the battery electrode may be adversely affected.

FIG. 1 shows a cross-sectional view illustrating a battery 100.

Battery 100 may, for example, be a lithium-ion battery, and may include battery electrodes 102 and 104. Battery electrode 102 may be configured as a cathode 102, and battery electrode 104 may be configured as an anode 104. The anode 104 may include, or may consist of, a semiconductor material, such as, for example, silicon. The battery 100 may further include a separator element 106 disposed between the cathode 102 and the anode 104, and an electrolyte 108. The electrolyte 108 may supply the cathode 102 and the anode 104 with ions (e.g. lithium ions) needed for charging and/or recharging the battery 100. A surface 104a of the anode 104 (e.g. a top surface of the anode 104) may face the electrolyte 108, and ions may be inserted or loaded into the anode 104 through the surface 104a of the anode 104. The anode 104 may include a substrate 110. The substrate 110 may be patterned to have a plurality of turrets 112 extending over a base region 114 of the substrate 110. The turrets 112 may serve to increase the surface area of the anode 104 and may thus enhance the storage capacity of the anode 104 during a charging and/or recharging process. In other words, anode 104 of battery 100 (e.g. a silicon anode of a lithium-ion battery) may have a structured surface made up of an array of turrets 112 which may be used to enhance the surface area of anode 114 for capacity reasons.

For example, the turrets 112 and the base region 114 may be formed by etching. Alternatively, the turrets 112 may be formed by selectively growing the turrets 112 over the base region 114. The battery 100 may include a passivation layer 116 formed over parts of the surface (e.g. one or more sidewalls) of the substrate 110 which do not face the electrolyte 108 and may provide a watertight and/or airtight encapsulation for the battery 100. In addition, a housing of the battery 100 (not shown) may be covered with the passivation layer 116. The passivation layer 116 may include different materials such as silicon oxide ($SiO_2$), silicon nitride ($Si_3N_4$), or other suitable passivation materials known as such in the art. The passivation layer 116 may prevent or reduce the diffusion of ions from the electrolyte 108 (e.g. lithium ions) to neighboring components (not shown). The battery 100 may include a sealant 118 formed over the cathode 102. The sealant 118 may provide a watertight and/or airtight encapsulation for the battery 100. The battery 100 may include one or more conductive layers 120, 122 formed on a side of the anode 104 facing away from the electrolyte 108, e.g. a side of the substrate 110 facing away from the electrolyte 108, e.g. a back side of the substrate 110.

Figure 2A:
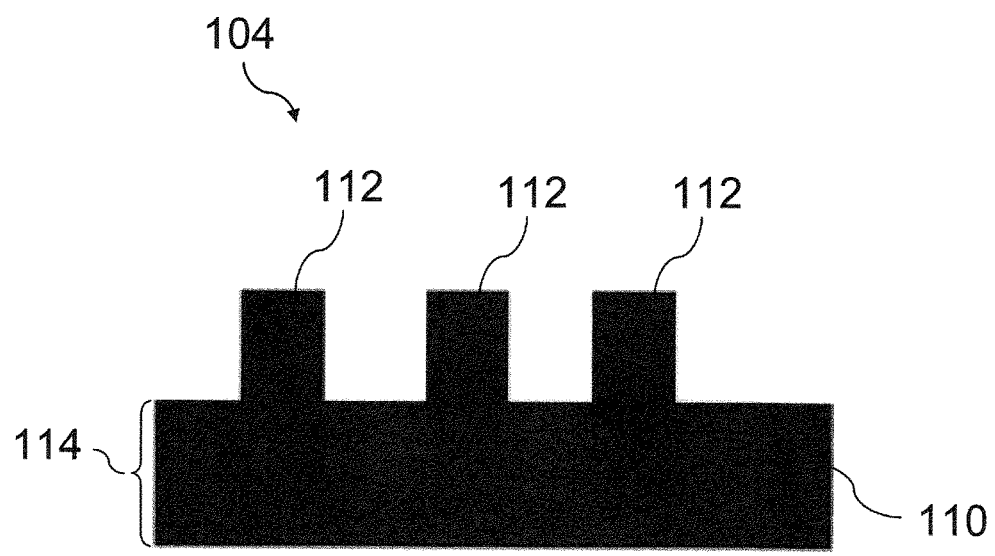
FIG. 2A and FIG. 2B show enlarged views of a section of an anode of the battery shown in FIG. 1.
Figure 2B:
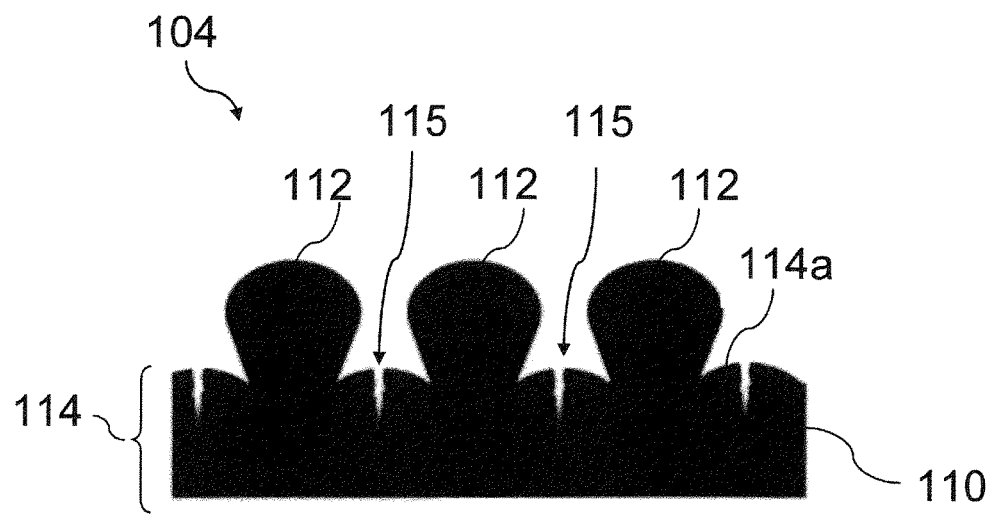

FIG. 2A and FIG. 2B show enlarged views of section A of anode 104 of the battery 100 shown in FIG. 1.

FIG. 2A shows, in a first view, an uncharged state of anode 104, in other words a state with no or substantially no ions (e.g. lithium ions) loaded into the anode 104. During charging of the battery 100, ions (e.g. lithium ions) may be inserted into the anode 104, and this may cause a volume expansion of the material of the anode 104, as shown in FIG. 2B in a second view. For example, for a silicon anode, a volume expansion of the silicon of up to 300% during ion insertion (e.g. lithium-ion insertion) may be observed while charging and/or recharging battery 100.

As shown in FIG. 2B, some regions of the anode 104 may expand with little stress and/or strain to the material of the anode 104, e.g. the turrets 112 of the anode 104. For example, the turrets 112 may expand without cracking and/or rupturing as ions (e.g. lithium ions) are loaded or inserted into the anode 104. However, as shown in FIG. 2B, there may be regions and/or surfaces of the anode 104, for example, a surface 114a of the base region 114, that may experience large stress and/or strain during volume expansion. These surfaces and/or regions may experience rupturing and/or cracking as a consequence of the large stress and/or strain (as indicated by arrows 115 in FIG. 2B) exerted on these surfaces and/or regions. For example, volume expansion of a silicon anode of a battery during charging of the battery may cause cracking and/or rupturing of a silicon base plate (indicated by base region 114 in FIG. 2B) of the silicon anode. Illustratively, ions (e.g. lithium ions) may be stored in the silicon base plate of the silicon anode, and this may cause the silicon base plate to expand, which may lead to cracking and/or rupturing of the silicon base plate and/or the housing of the battery 100. The amount of charging may be limited by this rupturing and/or cracking.

Cracking and/or rupturing of the material of the anode 104 in these regions and/or surfaces may decrease the charge storing capacity of the anode 104. Stated differently, these regions and/or surfaces of the anode 104 may exhibit a diminished ability to retain the ions that may be loaded or inserted into them. In addition, in case of a rechargeable battery 100, repeated charging of the battery 100 may expose these regions and/or surfaces to more stress and/or strain, thus worsening the cracking and/or rupturing in these regions. As a result, the lifetime of the battery 100 may be adversely affected. Accordingly, it may be desirable to provide battery electrodes (e.g. an anode) with the ability to store their charge (i.e. ions loaded or inserted into them) for a long period of time and/or to increase the number of ions that may be loaded or inserted into them, wherein cracking and/or rupturing of the material of the battery electrode is prevented or substantially reduced.

An effect of one or more embodiments may be prevention or substantial reduction of the diffusion of ions from an electrolyte into regions and/or surfaces of a battery electrode (e.g. anode) that may be prone to cracking and/or rupturing during a charging or recharging process, such as, for example, the base region 114 of anode 104 of battery 100 shown in FIG. 1.

An effect of one or more embodiments may be that insertion of ions into regions and/or surfaces of a battery electrode (e.g. anode) that may be prone to cracking and/or rupturing may be prevented or substantially reduced during a charging or recharging process (such as, for example, the base region 114 of anode 104 of battery 100 shown in FIG. 1).

An effect of one or more embodiments may be a substantial reduction in the volume expansion in regions and/or surfaces of a battery electrode (e.g. anode) that may be prone to cracking and/or rupturing during a charging or recharging process, such as, for example, the base region 114 of anode 104 of battery 100 shown in FIG. 1.

An effect of one or more embodiments may be prevention or substantial reduction of cracking and/or rupturing in a battery electrode during a charging or recharging process of a battery.

An effect of one or more embodiments may be prevention or substantial reduction of cracking and/or rupturing in a battery electrode over a plurality of charging and discharging cycles, e.g. tens, hundreds or thousands of, or even more, charging and discharging cycles.

An aspect of one or more embodiments may be that a battery electrode may be provided that may have the ability to store or retain ions loaded or inserted into it for a long period of time.

An effect of one or more embodiments may be enhancement or facilitation of insertion of ions into regions and/or surfaces of a battery electrode that may be less prone to cracking and/or rupturing during the charging or recharging process (such as, for example, the turrets 112 of anode 104 of battery 100 shown in FIG. 1).

An effect of one or more embodiments may be substantial reduction in the time it takes to charge a battery (e.g. to fully charge a battery). In other words, an effect of one or more embodiments may be substantial reduction of charging times.

Figure 3A:
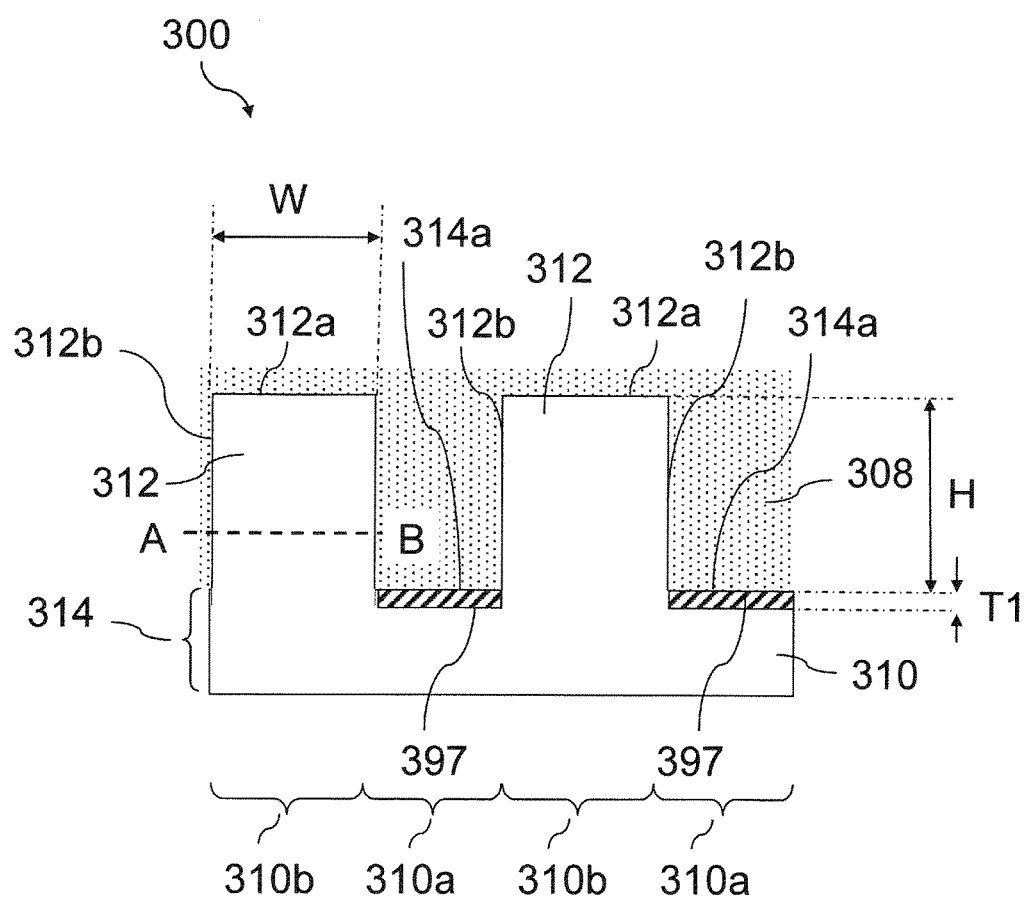
FIG. 3A and FIG. 3B show various cross-sectional views illustrating a battery electrode according to various embodiments.
Figure 3B:
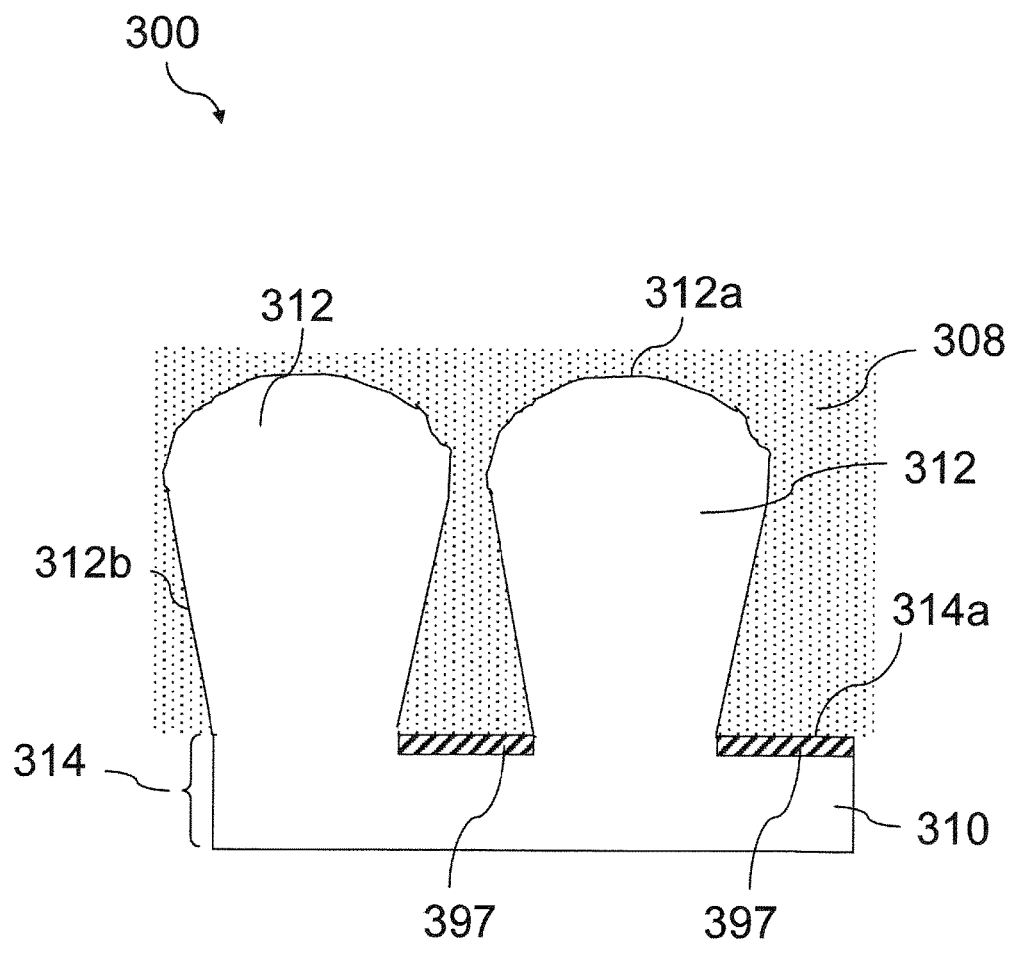

FIG. 3A and FIG. 3B show various cross-sectional views illustrating a battery electrode 300 according to various embodiments.

As shown in FIG. 3A in a first view, the battery electrode 300 may include a substrate 310. The substrate 310 may include a surface 312a, 312b, 314a configured to face an ion-carrying electrolyte 308. The battery electrode 300 may include a first diffusivity changing region 397 at a first portion 310a of the surface 312a, 312b, 314a, as shown in FIG. 3A. The surface 312a, 312b, 314a may further include a second portion 310b which may be free from the first diffusivity changing region 397, as shown in FIG. 3A.

In accordance with one or more embodiments, the battery electrode 300 may function as an anode in a discharge mode. In other words, the battery electrode 300 may be configured to be a negative plate of a battery configured to attract positively-charged ions and/or repel negatively-charged ions carried by the ion-carrying electrolyte 308. In other embodiments, the battery electrode 300 may function as a cathode in a discharge mode. In other words, the battery electrode 300 may be configured to be a positive plate of a battery configured to repel positively-charged ions and/or attract negatively-charged ions carried by the ion-carrying electrolyte 308.

In one or more embodiments, the first diffusivity changing region 397 may include, or may be, a region formed within the substrate 310. In one or more embodiments, the first diffusivity changing region 397 may include, or may be, a part of the surface 312a, 312b, 314a of the substrate 310. In one or more embodiments, the first diffusivity changing region 397 at the first portion 310a of the surface 312a, 312b, 314a of the substrate 310 may have been formed by implantation of ions into substrate 310, and may, for example, extend into the substrate 310 to a certain depth. For example, the first diffusivity changing region 397 may have a thickness T1 measured from the surface 314a of the substrate 310 (as shown in FIG. 3A).

In accordance with an embodiment, the first diffusivity changing region 397 may be configured to reduce the diffusion of ions carried by the electrolyte 308 into the substrate 310 (e.g. into a part of the substrate 310 below the first portion 310a of the surface 312a, 312b, 314a).

In accordance with an embodiment, the first diffusivity changing region 397 may have a thickness T1 of greater than or equal to about 1 nm, for example greater than or equal to about 25 nm, for example in the range from about 1 nm to about 10 μm, for example in the range from about 1 nm to about 1 μm, for example in the range from about 1 nm to about 100 nm, for example in the range from about 1 nm to about 50 nm, for example in the range from about 10 nm to about 25 nm, although other values may be possible as well in accordance with other embodiments.

In accordance with an embodiment, the substrate 310 may include, or may consist of, a semiconductor material such as, for example, silicon, although other semiconductor materials, including compound semiconductor materials, may be possible as well. In accordance with an embodiment, the semiconductor material may be selected from a group of materials, the group consisting of: silicon, germanium, gallium nitride, gallium arsenide, and silicon carbide, although other materials may be possible as well in accordance with other embodiments.

In accordance with an embodiment, the substrate 310 may be a doped substrate, for example, a doped semiconductor substrate, such as, for example, a doped silicon substrate, a doped germanium substrate, a doped gallium nitride substrate, a doped gallium arsenide substrate, or a doped silicon carbide substrate, although other doped substrates may be possible as well in accordance with other embodiments.

In this connection, the term "doped substrate" may include a case where the entire substrate 310 is doped, as well as a case where only a part (for example, an upper part) of the substrate 310 is doped. The substrate 310 may be a p-doped substrate (in other words, a substrate 310 doped with a p-type dopant) or an n-doped substrate (in other words, a substrate 310 doped with an n-type dopant). In accordance with an embodiment, the dopants for doping the substrate 310 may include, or may consist of, at least one material selected from a group of materials, the group consisting of: boron, aluminium, gallium, indium, antimony, phosphorus, arsenic, and antimony, although other materials may be possible as well in accordance with other embodiments. By way of an example, the substrate 310 may be a silicon substrate doped with a p-type dopant such as boron. By way of another example, the substrate 310 may be a silicon substrate doped with an n-type dopant such as phosphorous, arsenic or antimony.

In accordance with an embodiment, the substrate 310 may include, or may consist of, a material that may change its volume when loaded or inserted with the ions carried by the electrolyte 308. In accordance with an embodiment, the substrate 310 may include, or may consist of, a material that may increase in volume when the ions carried by the electrolyte 308 diffuse into the substrate 310. The maximum change in volume per unit volume of the material of the substrate 310 may sometimes be referred to as a maximum dilation of the material of the substrate 310. The maximum dilation of the material of the substrate 310 may be measured when the material of the substrate 310 is fully loaded or inserted with the ions carried by the electrolyte 308 such that acceptance of additional ions from the electrolyte 308 may not be possible (e.g. a silicon substrate which is fully lithiated with lithium ions carried by a lithium ion-carrying electrolyte).

In accordance with an embodiment, the substrate 310 may include, or may consist of, a material that may have a maximum dilation of greater than or equal to about 5% when fully loaded with ions carried by the electrolyte 308, for example greater than or equal to about 10%, for example greater than or equal to about 50%, for example greater than or equal to about 100%, for example greater than or equal to about 200%, for example greater than or equal to about 300%, for example in the range from about 5% to about 400%, for example, in the range from about 10% to about 400%, for example in the range from about 50% to about 400%, for example in the range from about 100% to about 400%, for example about 300%, although other maximum dilation values may be possible as well in accordance with other embodiments.

In accordance with an embodiment, the ions carried by the electrolyte 308 may include ions of at least one material selected from a group of materials, the group consisting of: an alkali metal, an alkaline earth metal, a chalcogen, and a halogen, although other materials may be possible as well in accordance with other embodiments.

In accordance with an embodiment, the ions carried by the electrolyte 308 may include ions of at least one material selected from a group of materials, the group consisting of: magnesium, sodium, lithium, potassium, calcium, oxygen, sulphur, chlorine, and fluorine, although other materials may be possible as well in accordance with other embodiments. An electrolyte 308 carrying lithium ions may also be referred at least one of a lithium ion-carrying electrolyte, a magnesium ion-carrying electrolyte, a sodium ion-carrying electrolyte, a potassium ion-carrying electrolyte, a calcium ion-carrying electrolyte, an oxygen ion-carrying electrolyte, a sulphur ion-carrying electrolyte, a chlorine ion-carrying electrolyte, and a fluorine-ion-carrying electrolyte, although other ion-carrying electrolytes may be possible as well in accordance with other embodiments.

In this connection, the battery electrode 300 may be an electrode (e.g. anode) of a lithium-ion battery (also referred to as lithium-ion battery electrode in the following). Similarly, battery electrode 300 may be an electrode (e.g. anode) of a magnesium-ion battery, a sodium-ion battery, a potassium-ion battery, a calcium-ion battery, an oxygen-ion battery, a sulphur-ion battery, a chlorine-ion battery, and/or a fluorine-ion battery, although battery electrode 300 may be used with other types of batteries as well in accordance with other embodiments.

In accordance with an embodiment, the substrate 310 may be a doped substrate, as mentioned above, and the first diffusivity changing region 397 at the first portion 310a of the surface 312a, 312b, 314a of the substrate 310 may include, or may consist of, a counter-doped region in the doped substrate 310. In accordance with an embodiment, the counter-doped region in the doped substrate 310 may be formed by implanting ions (e.g. counter-dopant ions) into the doped substrate 310. In one or more embodiments, the counter-doped region may be formed by implanting dopant ions (e.g. counter-dopant ions) into the doped substrate 310 and subsequently activating the implanted dopant ions (e.g. thermally activating, e.g. by heating, e.g. laser thermal heating). In one or more embodiments, thermally activating may allow recrystallization of the region of the doped substrate 310 implanted with the dopant ions (e.g. counter-dopant ions). In one or more embodiments, the counter-doped region may be formed by implanting dopant ions (e.g. counter-dopant ions) into the doped substrate 310 without activating the implanted dopant ions.

In one or more embodiments, the term "counter-doped region" may include or may refer to a region in the substrate 310 where a dopant concentration of the substrate 310 with dopants of one conductivity type (e.g. p-type dopants) may be at least substantially compensated with dopants of the opposite conductivity type (e.g. n-type dopants). For example, in one or more embodiments, the term "counter-doped region" may include or refer to a region in the substrate 310 having a smaller concentration of majority carriers of the substrate than the substrate itself.

For example, in accordance with one embodiment, the majority carriers of the substrate 310 may be holes (e.g. when the substrate 310 is doped or pre-doped with a p-type dopant to provide a p-type doped substrate). In accordance with this embodiment, the counter-doped region in the substrate 310 may have a smaller concentration of holes than the substrate 310. Similarly, in accordance with another embodiment, the majority carriers of the substrate 310 may be electrons (e.g. when the substrate 310 is doped or pre-doped with an n-type dopant to provide an n-type doped substrate). In accordance with this embodiment, the counter-doped region in the substrate 310 may have a smaller concentration of electrons than the substrate 310. Accordingly, the counter-doped region in the substrate 310 may have inherent material properties that may be different from those of the substrate 310.

In one or more embodiments, the term "counter-doped region" may include or may refer to a region in the substrate 310 where a dopant concentration of the substrate 310 with dopants of one conductivity type is overcompensated with dopants of the opposite conductivity type. In this case, the type of majority carriers in the counter-doped region in the substrate 310 may be different from the type of majority carriers of the substrate 310. For example, the majority carriers of the counter-doped region may consist of holes, while the majority carriers of the substrate 310 may consist of electrons, or vice versa. Accordingly, the counter-doped region in the substrate 310 may have inherent material properties that may be different from those of the substrate 310.

Therefore, in accordance with an embodiment, the substrate 310 may be a doped substrate, and the first diffusivity changing region 397 may include, or may consist of, a counter-doped region in the doped substrate 310. In accordance with an embodiment, the doped substrate 310 may be doped with an n-type dopant, and the counter-doped region in the doped substrate 310 forming the first diffusivity changing region 397 may be doped with a p-type dopant, or vice versa.

In accordance with one or embodiments, the counter-doped region in the doped substrate 310 may act as a barrier (e.g. an electric potential barrier and/or a physical barrier and/or a chemical barrier (e.g. diffusion barrier)) to the diffusion of ions (e.g. lithium ions) carried by the electrolyte 308 (e.g. lithium ion-carrying electrolyte) into the substrate 310. Therefore, in one or more embodiments, the counter-doped region in the doped substrate 310 may reduce (e.g. decrease and/or retard) the diffusion of ions carried by the electrolyte 308 into the substrate 310. Thus, the first diffusivity changing region 397 may be configured to act as a diffusion barrier and/or an electric potential barrier at the surface 314a of the battery electrode 300 (e.g. an anode of a battery, for example, a silicon anode of a lithium-ion battery).

In accordance with an embodiment, the substrate 310 may include a base region 314 and at least one protrusion 312 extending from the base region 314 (e.g. extending above the base region 314 and/or extending into the ion-carrying electrolyte 308), as shown in FIG. 3A. Base region 314 may, for example, include or be configured as a base plate of the battery electrode 300. The surface 312a, 312b, 314a of the substrate 310 configured to face the ion-carrying electrolyte 308 may include, or may consist of, a surface 314a of the base region 314 (e.g. a top surface of the base region 314) and a surface 312a, 312b of the at least one protrusion 312. In one or more embodiments, the surface 312a, 312b of the at least one protrusion 312 may include, or may consist of, a surface of one or more sidewalls 312b of the at least one protrusion 312 and/or a surface 312a facing away from the base region 314 (e.g. a top surface of the at least one protrusion 312).

In accordance with an embodiment, the at least one protrusion 312 may, for example, have the shape of a pillar, a turret, a tower, a pyramid, an inverse pyramid, a truncated cone, or an inverse truncated cone, although other shapes may be possible as well in accordance with other embodiments.

In accordance with an embodiment, a cross-section of the at least one protrusion 312 along a plane A-B shown in FIG. 3A may, for example, have a circular shape, a rectangular shape, a triangular shape, an oval shape, a quadratic shape, a polygonal shape, or an irregular shape, although other shapes may be possible as well in accordance with other embodiments.

In accordance with an embodiment, a height H of the at least one protrusion 312 may be greater than or equal to about 30 µm, for example in the range from about 30 µm to about 450 µm, for example in the range from about 30 µm to about 100 µm, for example in the range from about 35 µm to about 50 µm, for example about 35 µm, although other values may be possible as well in accordance with other embodiments.

In accordance with an embodiment, a width W of the at least one protrusion 312 may be less than or equal to about 500 µm, for example less than or equal to about 350 µm, for example less than or equal to about 150 µm, for example less than or equal to about 100 µm, for example less than or equal to about 70 µm, for example, about 50 µm, for example in the range from about 1 nm to about 500 µm, for example in the range from about 1 nm to about 350 µm, for example in the range from about 1 nm to about 150 µm, for example in the range from about 1 nm to about 100 µm, for example in the range from about 1 nm to about 70 µm, for example in the range from about 1 nm to about 50 µm, although other values may be possible as well in accordance with other embodiments.

In one or more embodiments, the substrate 310 may include a plurality of protrusions 312, as shown in FIG. 3A (two protrusions 312 are shown as an example, however the number of protrusions 312 may be greater than two, and may, for example, be tens, hundreds, or thousands of, or even more, protrusions in some embodiments). The protrusions 312 may all have the same or substantially the same width W and/or height H. However, it may be possible that the width W and/or height H of at least one protrusion of the plurality of protrusions 312 may be different from the width W and/or height H of at least one other protrusion of the plurality of protrusions 312.

In accordance with an embodiment, the first portion 310a of the surface 312a, 312b, 314a of the substrate 310 may include, or may consist of, the surface 314a of the base region 314, and the second portion 310b of the surface 312a, 312b, 314a of the substrate 310 may include, or may consist of, the surface 312a, 312b of the at least one protrusion 312, such as, for example, the surface of one or more sidewalls 312b of the at least one protrusion 312 and/or the surface 312a of the at least one protrusion 312 facing away from the base region 314 (as shown in FIG. 3A).

As described above, the first diffusivity changing region 397 may be at the first portion 310a of the surface 312a, 312b, 314a of the substrate 310 configured to face the ion-carrying electrolyte 308 (e.g. a lithium ion carrying electrolyte). Therefore, in accordance with an embodiment, the first diffusivity changing region 397 may be at the surface 314a of the base region 314, and the surface of the at least one protrusion 312 may be free from the first diffusivity changing region 397 (e.g. the surface of one or more sidewalls 312b of the at least one protrusion 312 and/or the surface 312a facing away from the base region 314 may be free from the first diffusivity changing region 397, as shown in FIG. 3A). For example, the first diffusivity changing region 397 may be at a surface of a baseplate of a battery electrode (e.g. the surface 314a of the base region 314 of the battery electrode 300).

In accordance with an embodiment, the first diffusivity changing region 397 at the surface 314a of the base region 314 may be configured to reduce (e.g. decrease and/or retard) the diffusion of ions carried by the electrolyte 308 into the substrate 310 (e.g. into a part of the substrate 310 below the surface 314a of the base region 314). Illustratively, the first diffusivity changing region 397 may act as a diffusion barrier and/or an electric potential barrier to the diffusion of ions carried by the electrolyte 308 into the substrate 310.

In accordance with an embodiment, an effect of the first diffusivity changing region 397 being at the surface 314a of the base region 314 may be the prevention or substantial reduction of rupturing and/or cracking in the battery electrode 300 during or after the charging and/or re-charging process and/or the discharge of a battery.

In accordance with an embodiment, an effect of the first diffusivity changing region 397 being at the surface 314a of the base region 314 may be prevention or substantial reduction of the diffusion of ions from the electrolyte 308 into regions and/or surfaces of the battery electrode 300 that may be prone to cracking and/or rupturing during the charging or recharging process, such as, for example, the base region 314 of the substrate 310 of the battery electrode 300.

In accordance with an embodiment, an effect of the first diffusivity changing region 397 being at the surface 314a of the base region 314 may be that insertion of ions into regions and/or surfaces of the battery electrode 300 that may be prone to cracking and/or rupturing during the charging or recharging process (such as, for example, the base region 314 of the substrate 310) may be prevented or substantially reduced.

In accordance with an embodiment, an effect of the first diffusivity changing region 397 being at the surface 314a of the base region 314 may be substantial reduction in the volume expansion in regions and/or surfaces of the battery electrode 300 that may be prone to cracking and/or rupturing during the charging or recharging process, such as, for example, the base region 314 of the substrate 310.

In accordance with an embodiment, an effect of the first diffusivity changing region 397 being at the surface 314a of the base region 314 may be the prevention or substantial reduction of cracking and/or rupturing in the battery electrode 300 over a plurality of charging and discharging cycles.

In accordance with an embodiment, the first diffusivity changing region 397 being at the surface 314a of the base region 314 may help to provide a battery electrode 300 having the ability to store or retain the ions loaded or inserted into it for a long period of time.

As shown in FIG. 3B in a second view, rupturing and/or cracking in the battery electrode 300 during charging or recharging of the battery may be prevented or substantially reduced by means of the first diffusivity changing region 397 being at the surface 314a of the base region 314. The ions carried by the electrolyte 308 may be prevented by the first diffusivity changing region 397 from diffusing into the base region 314 of the substrate 310, whilst in-diffusion of ions from the electrolyte 308 into the at least one protrusion 312 of the substrate 310 may proceed in an unimpeded manner. As shown in FIG. 3B, this may prevent or substantially reduce volume expansion of the battery electrode 300 in the base region 314. Illustratively, in one or more embodiments, the build-up of a diffusion barrier and/or an electric potential bather by the first diffusivity changing region 397 may prevent or substantially reduce the storage of ions (e.g. lithium ions) in the base region 314 (e.g. baseplate) of the battery electrode 300 (e.g. silicon battery electrode). In accordance with one or more embodiments, the first diffusivity changing region 397, which may be formed e.g. by ion implantation, may be robust against delamination during a charge and/or a discharge cycle due to intrinsic material characteristics of the implanted first diffusivity changing region 397.

Figure 4A:
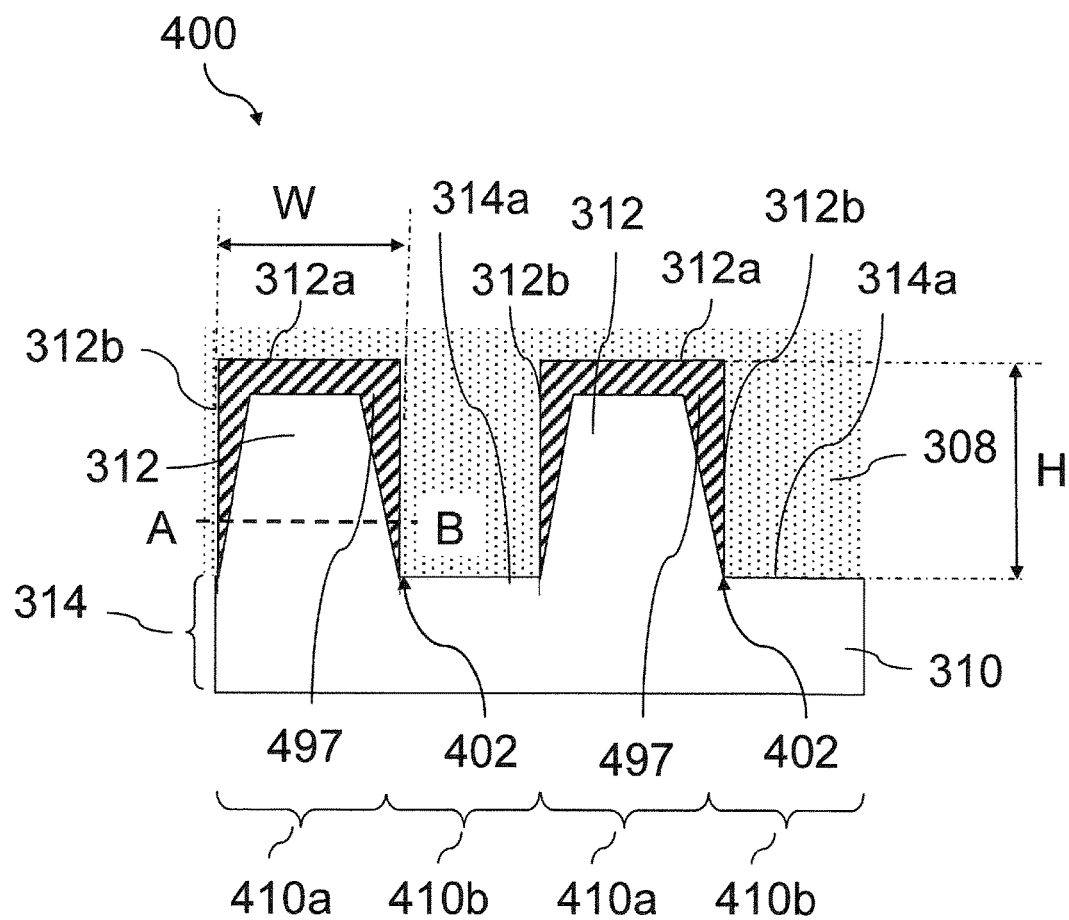
FIG. 4A and FIG. 4B show various cross-sectional views illustrating a battery electrode according to various embodiments.
Figure 4B:
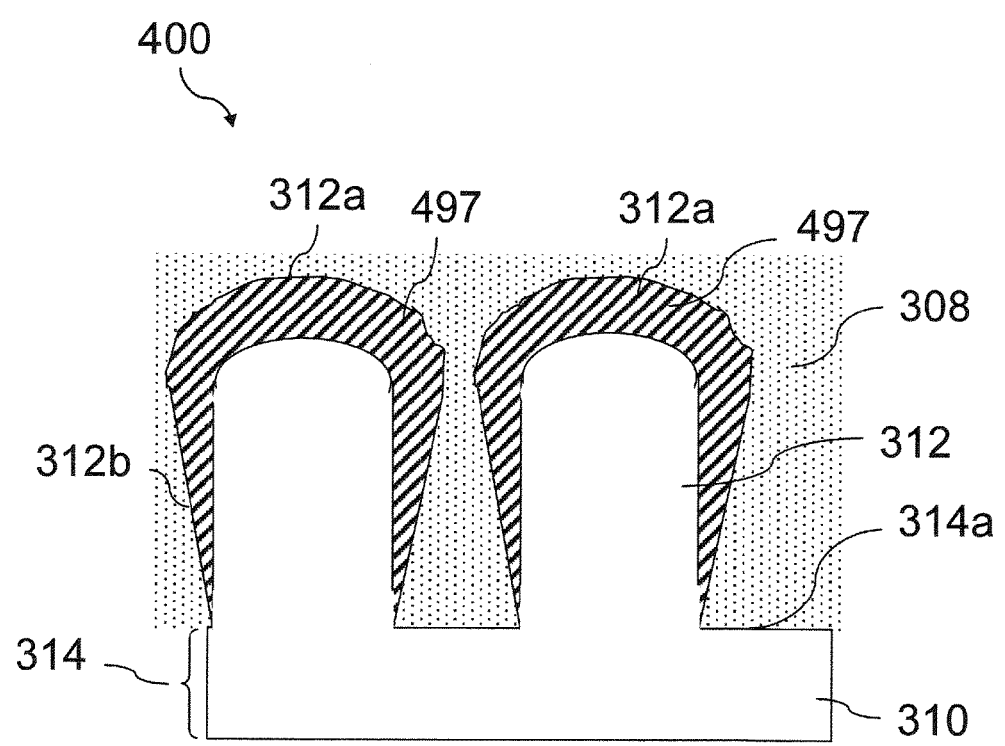

FIG. 4A and FIG. 4B show various cross-sectional views illustrating a battery electrode 400 according to various embodiments.

Reference signs in FIG. 4A and FIG. 4B that are the same as in FIG. 3A and FIG. 3B denote the same or similar elements as in FIG. 3A and FIG. 3B. Thus, those elements will not be described in detail again here; reference is made to the description above. Differences between FIG. 4A and FIG. 3A are described below.

In the battery electrode 400, a first diffusivity changing region 497 may be at a first portion 410a of a surface 312a, 312b, 314a of a substrate 310 configured to face an ion-carrying electrolyte 308 (e.g. a lithium ion carrying electrolyte), whereas a second portion 410b of the surface 312a, 312b, 314a of the substrate 310 may be free from the first diffusivity changing region 497. As shown in FIG. 4A, the first portion 410a of the surface 312a, 312b, 314a of the substrate 310 may include, or may consist of, the surface 312a, 312b of at least one protrusion 312, such as, for example, the surface of one or more sidewalls 312b of the at least one protrusion 312 and/or a surface 312a facing away from the base region 314, while the second portion 410b of the surface 312a, 312b, 314a of the substrate 310 may include, or may consist of the surface 314a of the base region 314, such as, for example, a top surface of the base region 314 (as shown in FIG. 4A).

In accordance with an embodiment, the first diffusivity changing region 497 may be at the surface 312a, 312b of the at least one protrusion 312 (e.g. the surface of one or more sidewalls 312b of the at least one protrusion 312 and the surface 312a facing away from the base region 314), and the surface 314a of the base region 314 (e.g. a top surface of the base region 314) may be free from the first diffusivity changing region 497, as shown in FIG. 4A.

In accordance with an embodiment, the first diffusivity changing region 497 may be configured to enhance (e.g. increase and/or facilitate) the diffusion of ions carried by the electrolyte 308 into the substrate 310 (e.g. into the at least one protrusion 312). For example, the first diffusivity changing region 497 may act as a diffusion enhancer and/or may have an intrinsic electric potential which may increase and/or facilitate the diffusion of ions carried by the electrolyte 308 into the substrate 310. In other words, the first diffusivity changing region 497 may have a diffusion enhancing effect and/or may build up an intrinsic electric potential, which may increase the diffusion process.

In accordance with an embodiment, the first diffusivity changing region 497 may include, or may be, an amorphized region in the substrate 310. In accordance with an embodiment, the amorphized region in the substrate 310 may be formed by implanting ions (e.g. protons, dopant ions, counter-dopant ions) into the substrate 310.

In one or more embodiments, the substrate 310 (e.g. a doped or undoped semiconductor substrate, e.g. including or consisting of silicon, or other semiconductor materials) may include, or may consist of, a material having a regular crystalline structure or a long-range lattice order that is characteristic of a crystal (e.g. a regular crystalline structure of any one of a silicon crystal, a germanium crystal, a gallium nitride crystal, a gallium arsenide crystal, a silicon carbide crystal).

In accordance with an embodiment, the amorphized region in the substrate 310 may be a region in the substrate 310 that may have an amorphous structure, for example a structure having an irregular crystalline structure or a structure without any long-range lattice order characteristic of a crystal. By way of an example, the amorphized region may include, or may have an irregular glass structure.

In accordance with an embodiment, the amorphized region may facilitate the diffusion of ions from the electrolyte 308 into the substrate 310, for example into the at least one protrusion 312. Accordingly, in one or more embodiments, the amorphized region in the substrate 310 may be configured to enhance (e.g. increase and/or facilitate) the diffusion of ions carried by the electrolyte 308 into the substrate 310. For example, the amorphized region in the substrate 310 may act as a diffusion enhancer and/or may have an intrinsic electric potential which may increase and/or facilitate the diffusion of ions carried by the electrolyte 308 into the substrate 310.

In accordance with an embodiment, the thickness of the first diffusivity changing region 497 may be in the range from about 1 nm to about 10 μm, for example in the range from about 1 nm to about 1 μm, for example in the range from about 1 nm to about 100 nm, for example in the range from about 1 nm to about 50 nm, for example in the range from about 10 nm to about 25 nm, although other values may be possible as well in accordance with other embodiments.

In accordance with an embodiment, an effect of the first diffusivity changing region 497 being at the surface 312a, 312b of the at least one protrusion 312 may be enhancement or facilitation of the insertion of ions into regions and/or surfaces of the battery electrode 400 that may be less prone to cracking and/or rupturing during the charging or recharging process (such as, for example, the at least one protrusion 312 of the substrate 310).

In accordance with an embodiment, an effect of the first diffusivity changing region 497 being at the surface 312a, 312b of the at least one protrusion 312 may be the storage or insertion of more ions per unit time from the electrolyte 308 into the at least one protrusion 312 of the battery electrode 400 compared to the storage or insertion of ions per unit time from the electrolyte 308 into other regions (e.g. the base region 314) of the battery electrode 400.

In accordance with an embodiment, the first diffusivity changing region 497 at the surface 312a, 312b of the at least one protrusion 312 may have a graded thickness (as shown in FIG. 4A). In accordance with an embodiment, the graded thickness may have a linear profile (as shown in FIG. 4A), although other thickness profiles may be possible as well in accordance with other embodiments.

In accordance with an embodiment, the graded thickness of the first diffusivity changing region 497 at the surface 312a, 312b of the at least one protrusion 312 may increase from a foot 402 of the at least one protrusion 312 to the surface 312a of the at least one protrusion 312 facing away from the base region 314 (e.g. a top surface of the at least one protrusion 312). For example, in regions of the at least one protrusion 312 that may be able to accommodate or withstand larger volume expansions (e.g. regions of the at least one protrusion 312 that are closer to the surface 312a facing away from the base region 314), the first diffusivity changing region 497 may have a greater thickness than in regions of the at least one protrusion 312 that may only be able to accommodate or withstand smaller volume expansions (e.g. regions closer to the foot 402 of the at least one protrusion 312).

In accordance with an embodiment, an effect of the graded thickness of the first diffusivity changing region 497 at the surface 312a, 312b of the at least one protrusion 312 may be a smooth fading out of a diffusion enhancing effect from the surface 312a of the at least one protrusion 312 facing away from the base region 314 to the foot 402 of the at least one protrusion 312. Therefore, an effect of the graded thickness of the first diffusivity changing region 497 may be that rupturing and/or cracking in some parts of the at least one protrusion 312 (e.g. at the foot 402 of the at least one protrusion 312) may be prevented and/or substantially reduced.

As shown in FIG. 4B in a second view, ions may be stored and/or retained in regions and/or surfaces of the battery electrode 400 that may be less prone to cracking and/or rupturing during the charging or recharging process (such as, for example, the at least one protrusion 312 of the substrate 310). For example, the first diffusivity changing region 497 at the prominent structures of the battery electrode (e.g. the at least one protrusion 312) may act as a diffusion enhancer and/or a region having an intrinsic electric potential bather, which may prevent or substantially reduce the storage of ions (e.g. lithium ions) in the base region 314 (e.g. baseplate) of the battery electrode 300 (e.g. silicon battery electrode).

Figure 5:
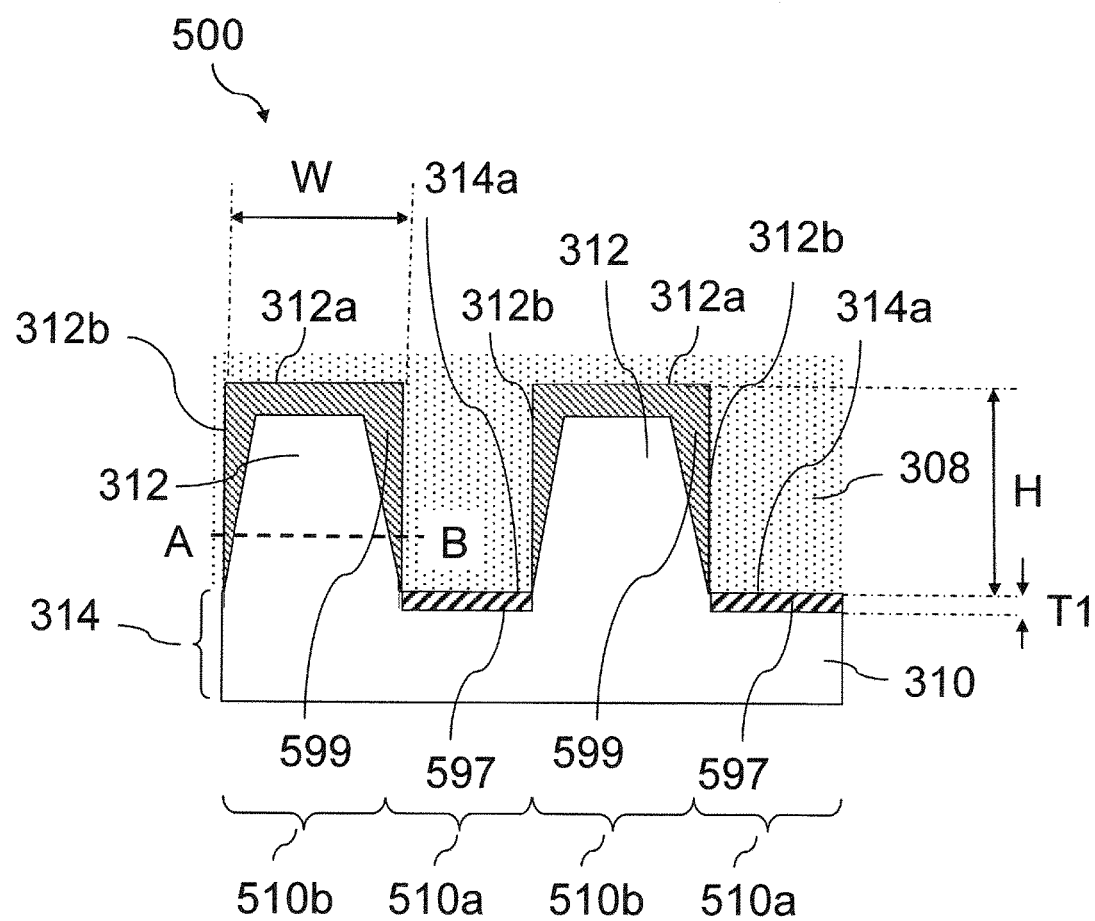
FIG. 5 shows a cross-sectional view illustrating a battery electrode according to various embodiments.

FIG. 5 shows a cross-sectional view illustrating a battery electrode 500 according to various embodiments.

Reference signs in FIG. 5 that are the same as in FIG. 3A and FIG. 3B denote the same or similar elements as in FIG. 3A and FIG. 3B. Thus, those elements will not be described in detail again here; reference is made to the description above. Differences between FIG. 5 and FIG. 3A are described below.

In accordance with an embodiment, the battery electrode 500 may include a first diffusivity changing region 597 at a first portion 510a of the surface 312a, 312b, 314 of the substrate 310, and a second diffusivity changing region 599 at a second portion 510b of the 312a, 312b, 314 of the substrate 310. In accordance with an embodiment, the first portion 510a of the surface 312a, 312b, 314 of the substrate 310 may include, or may consist of, the surface 314a of the base region 314, and the second portion 510b of the surface 312a, 312b, 314 of the substrate 310 may include, or may consist of, the surface 312a, 312b of the at least one protrusion 312. Accordingly, in one or more embodiments, the first diffusivity changing region 597 may be at the surface 314a of the base region 314, and the second diffusivity changing region 599 may be at the surface 312a, 312b of the at least one protrusion 312, as shown in FIG. 5.

In one or more embodiments, the first diffusivity changing region 597 may be configured similarly to the first diffusivity changing region 397 shown in FIG. 3A, and may for example be configured to reduce (e.g. decrease and/or retard) the diffusion of ions carried by the electrolyte 308 into the substrate 310 (e.g. into the base region 314).

For example, in one or more embodiments, the substrate 310 may be a doped substrate, and the first diffusivity changing region 597 may include or may be a counter-doped region in the doped substrate 310 and may be configured to act as a bather (e.g. an electric potential bather and/or a physical bather (e.g. diffusion barrier)) to the diffusion of ions (e.g. lithium ions) carried by the electrolyte 308 (e.g. lithium ion-carrying electrolyte) into the substrate 310, similarly to the first diffusivity changing region 397 as described above in connection with FIG. 3A and FIG. 3B.

In one or more embodiments, the second diffusivity changing region 599 may be configured similarly to the first diffusivity changing region 497 shown in FIG. 4A, and may for example be configured to enhance (e.g. increase and/or facilitate) the diffusion of ions carried by the electrolyte 308 into the substrate 310 (e.g. into the at least one protrusion 312).

For example, in one or more embodiments, the second diffusivity changing region 599 may include or may be an amorphized region in the substrate 310 (e.g. a doped or undoped semiconductor substrate) and may be configured to enhance (e.g. increase and/or facilitate) the diffusion of ions carried by the electrolyte 308 into the substrate 310 (e.g. into the at least one protrusion 312), similarly to the first diffusivity changing region 497 as described above in connection with FIG. 4A and FIG. 4B.

Thus, the battery electrode 500 shown in FIG. 5 may combine one or more effects of the battery electrode 300 shown in FIG. 3A and FIG. 3B with one or more effects of the battery electrode 400 shown in FIG. 4A and FIG. 4B.

Figure 6:
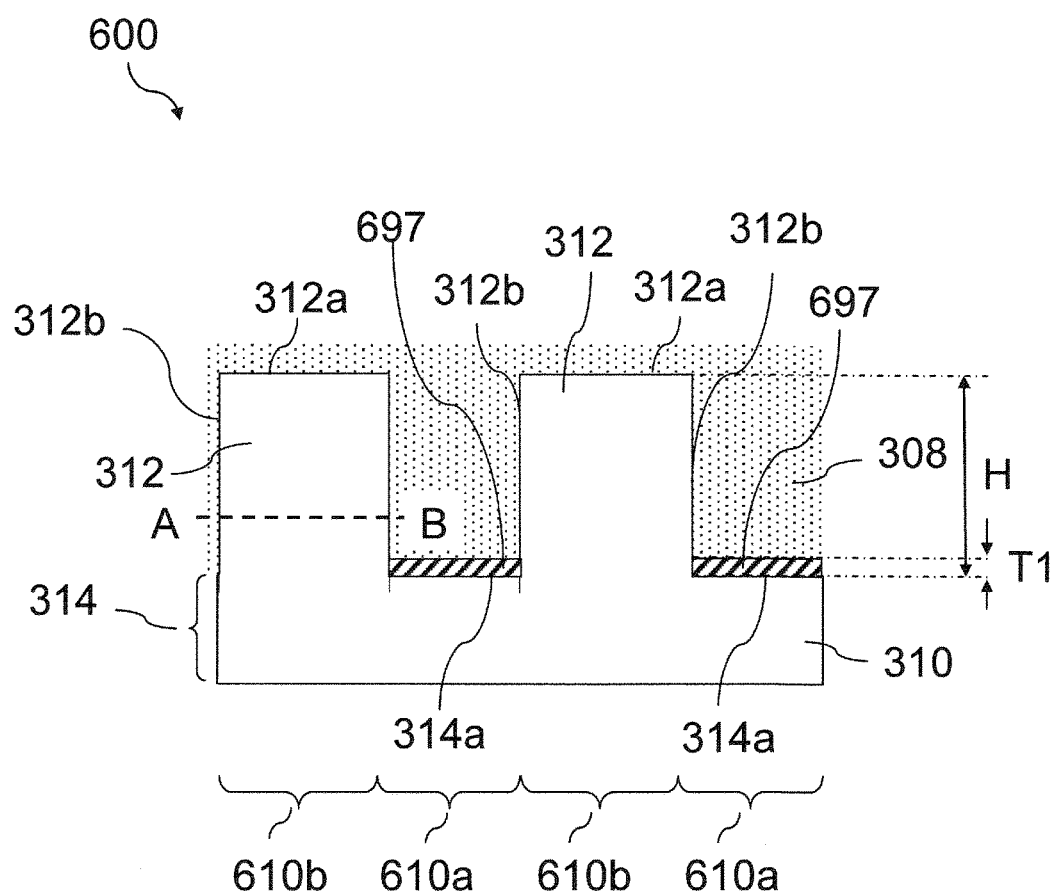
FIG. 6 shows a cross-sectional view illustrating a battery electrode according to various embodiments.

FIG. 6 shows a cross-sectional view illustrating a battery electrode 600 according to various embodiments.

Reference signs in FIG. 6 that are the same as in FIG. 3A denote the same or similar elements as in FIG. 3A. Thus, those elements will not be described in detail again here; reference is made to the description above. Differences between FIG. 3A and FIG. 6 are described below.

The battery electrode 600 may include a first diffusivity changing region 697 at a first portion 610a of the surface 312a, 312b, 314a of the substrate 310. The first diffusivity changing region 697 may be disposed over the first portion 610a of the surface 312a, 312b, 314a of the substrate 310, as shown in FIG. 6. In accordance with an embodiment, the first portion 610a of the surface 312a, 312b, 314a of the substrate 310 may include, or may consist of, the surface 314a of the base region 314 (as shown in FIG. 6). In accordance with one or more embodiments, the first diffusivity changing layer 697 may include or may be a first diffusivity changing layer.

In accordance with one or more embodiments, the first diffusivity changing region 697 may include, or may be a polymer layer, or a polymer-like layer. In accordance with an embodiment, the first diffusivity changing region 697 at the first portion 610a of the surface 312a, 312b, 314a of the substrate 310 may include, or may consist of, a resist material (e.g. a photo-resist, an imide material, a polyimide material, an epoxy material).

In accordance with other embodiments, the first diffusivity changing region 697 may include, or may consist of, a metal or metal alloy. In accordance with an embodiment, the metal may include at least one metal selected from a group of metals, the group consisting of: copper, nickel, cobalt, iron, manganese, chromium, vanadium, titanium, rhodium, ruthenium, molybdenum, niobium, zirconium, iridium, osmium, rhenium, tungsten, tantalum and hafnium, or an alloy containing at least one of the aforementioned metals.

In accordance with an embodiment, the first diffusivity changing region 697 may act as a barrier (e.g. a physical barrier (such as, for example, a diffusion barrier)) to the diffusion of ions (e.g. lithium ions) carried by the electrolyte 308 (e.g. lithium ion-carrying electrolyte) into the substrate 310. In other words, the first diffusivity changing region 697 may be configured to reduce (e.g. decrease and/or retard) the diffusion of ions (e.g. lithium ions) carried by the electrolyte 308 (e.g. lithium ion-carrying electrolyte) into the substrate 310 (e.g. semiconductor substrate, e.g. undoped or doped silicon substrate).

In one or more embodiments, the first diffusivity changing region 697 may be formed by depositing a resist layer (e.g. photo-resist or polymer like layer) over the entire substrate 310 (e.g. wafer). After deposition, the resist layer may be structured by recess processing to yield the first diffusivity changing region 697. The first diffusivity changing region 697 may serve as a diffusion barrier or a diffusion reduction layer against ions (e.g. lithium ions) carried by the electrolyte such that cracking and/or rupturing of the base region 314 of the substrate 310 (e.g. silicon substrate) may be prevented or substantially reduced.

Various embodiments may provide methods for manufacturing a battery electrode.

Figure 7:
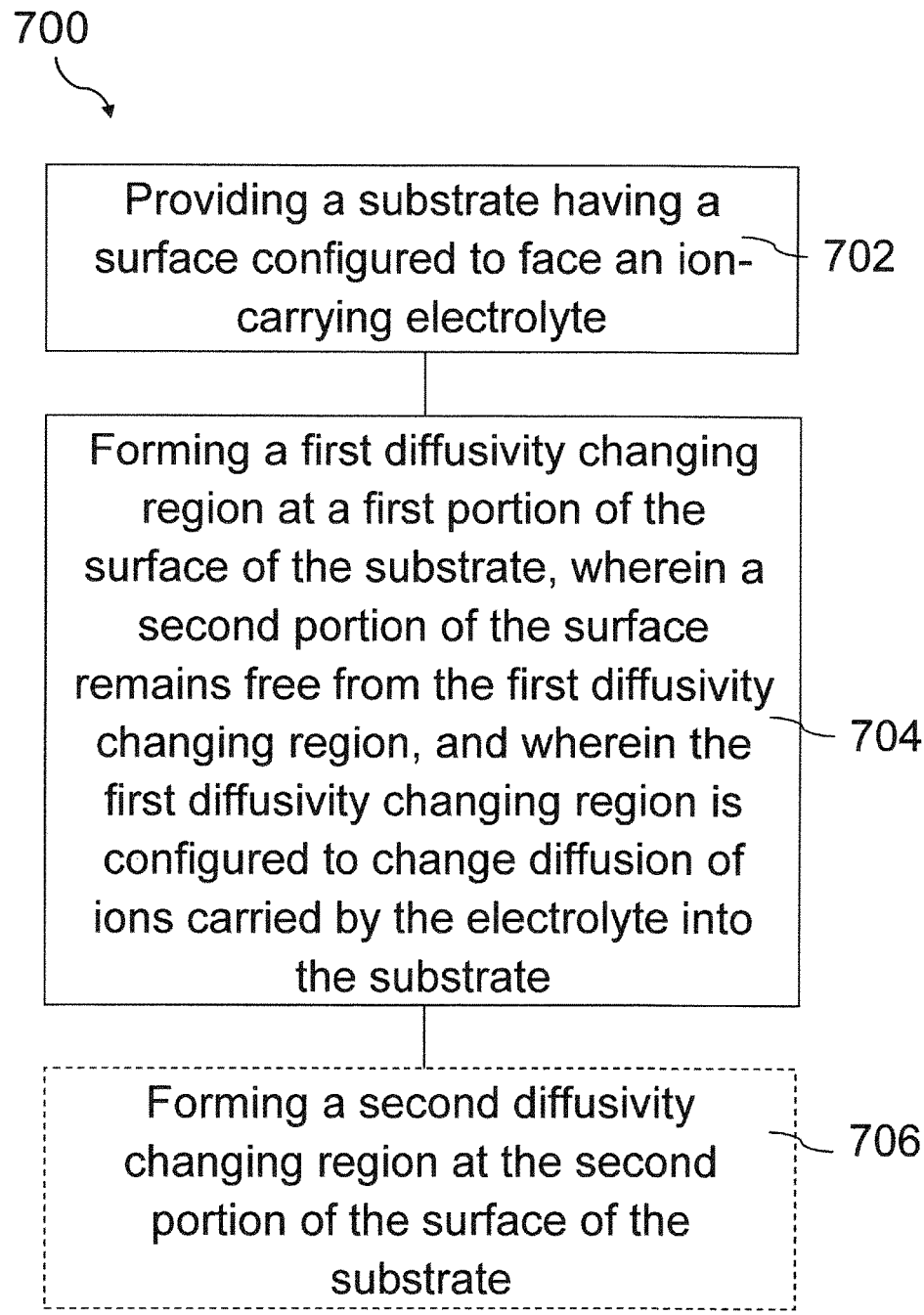
FIG. 7 shows a method for manufacturing a battery electrode according to various embodiments.

FIG. 7 shows a method 700 for manufacturing a battery electrode according to various embodiments.

In accordance with an embodiment, the method 700 for manufacturing a battery electrode may be used to manufacture an anode. In accordance with an embodiment, the method 700 for manufacturing a battery electrode may be used to manufacture a cathode.

The method 700 may include providing a substrate having a surface configured to face an ion-carrying electrolyte (in 702); and forming a first diffusivity changing region at a first portion of the surface of the substrate (in 704). A second portion of the surface may remain free from the first diffusivity changing region. The first diffusivity changing region may be configured to change diffusion of ions carried by the electrolyte into the substrate.

In accordance with an embodiment, the first diffusivity changing region may be configured to reduce the diffusion of ions carried by the electrolyte into the substrate. In accordance with another embodiment, the first diffusivity changing region may be configured to enhance the diffusion of ions carried by the electrolyte into the substrate.

In accordance with an embodiment, the substrate may be a doped substrate (including or consisting of e.g. a p-doped semiconductor material or an n-doped semiconductor material). In this embodiment, forming the first diffusivity changing region at the first portion of the surface of the substrate (in 704) may include forming a counter-doped region in the doped substrate. In accordance with an embodiment, forming the counter-doped region in the doped substrate may include implanting counter-doping ions into the doped substrate and annealing the substrate after implanting the counter-doping ions.

In one or more embodiments, the method 700 may further include forming a second diffusivity changing region at the second portion of the surface of the substrate (in 706). In accordance with an embodiment, the first diffusivity changing region formed at the first portion of the surface of the substrate (in 704) may be configured to reduce (e.g. decrease and/or retard) diffusion of ions carried by the electrolyte into the substrate, and the second diffusivity changing region formed at the second portion of the surface of the substrate (in 706) may be configured to enhance (e.g. increase and/or facilitate) diffusion of ions carried by the electrolyte into the substrate.

The battery electrode, or one or more parts of the battery electrode, may further be configured in accordance with one or more embodiments described herein, for example one or more embodiments described herein above in connection with FIG. 3A to FIG. 6.

FIG. 8A to FIG. 8G show various cross-sectional views illustrating a method for manufacturing a battery electrode according to various embodiments and may, for example, be used to manufacture battery electrode 400 shown in FIG. 4A.

Reference signs in FIG. 8A to FIG. 8G that are the same as in FIG. 4A denote the same or similar elements as in FIG. 4A. Thus, those elements will not be described in detail again here; reference is made to the description above.

The method for manufacturing a battery electrode may include patterning a substrate 310 before forming a first diffusivity changing region 497 at a first portion 410a of the substrate 310, as shown in FIG. 8A to 8D. In one or more embodiments, the substrate 310 may be a doped substrate (e.g. doped semiconductor substrate, e.g. doped silicon substrate).

Figure 8A:
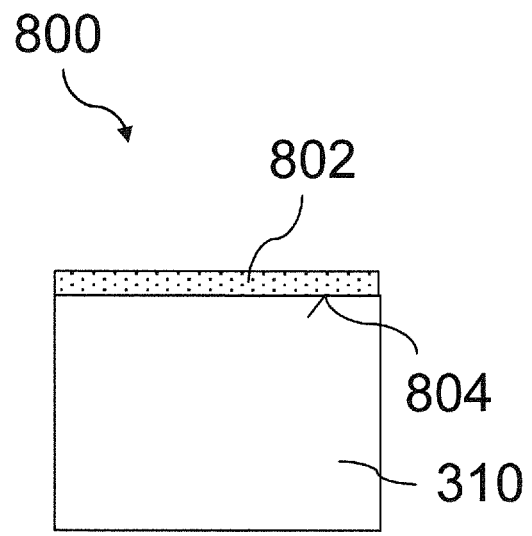
FIG. 8A to FIG. 8G show various cross-sectional views illustrating a method for manufacturing a battery electrode according to various embodiments.

As shown in FIG. 8A in a view 800, patterning a substrate 310 may include forming a mask layer 802, for example a resist layer (e.g. a photo-resist layer) or a hard mask (e.g. silicon nitride layer), over a surface 804 (e.g. a top surface) of the substrate 310. Forming the mask layer 802 (e.g. a resist layer, e.g. photo-resist layer) over the surface 804 of substrate 310 may, for example, be performed using a deposition process such as, for example, at least one of a chemical vapor deposition (CVD) process, a low-pressure CVD (LPCVD) process, a plasma-enhanced chemical vapor deposition (PECVD) process, a high-density plasma chemical vapor deposition (HDP-CVD) process, a physical vapor deposition (PVD) process, a sputtering process, and a spin coating process, or other suitable deposition processes, which may be known as such in the art.

Figure 8B:
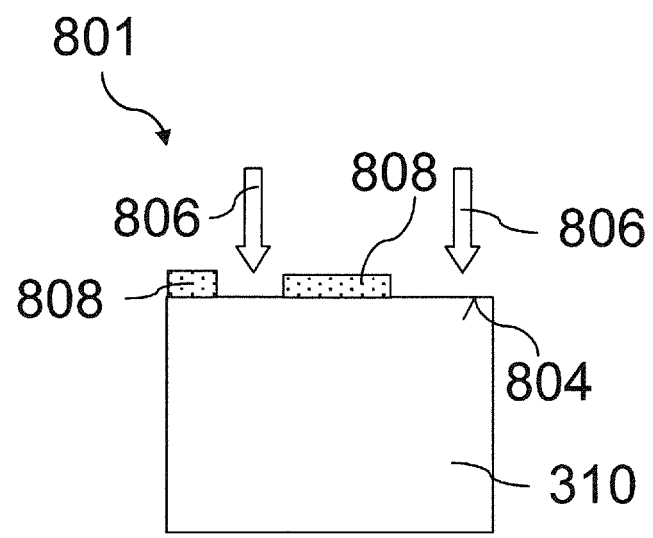

As shown in FIG. 8B in a view 801, patterning the substrate 310 may further include patterning the mask layer 802 (indicated by arrows 806) to remove a part of the mask layer 802 from the surface 804 of the substrate 310 to form a patterned mask layer 808. Patterning the mask layer 802 (indicated by arrows 806) may be performed by means of an etching process such as, for example, a wet etch process or a dry etch process (e.g. a plasma etch process), or (e.g. in case of a resist layer) by means of a lithographic process including exposure, development, and resist stripping, or by means of other suitable processes which may be known as such in the art.

Figure 8C:
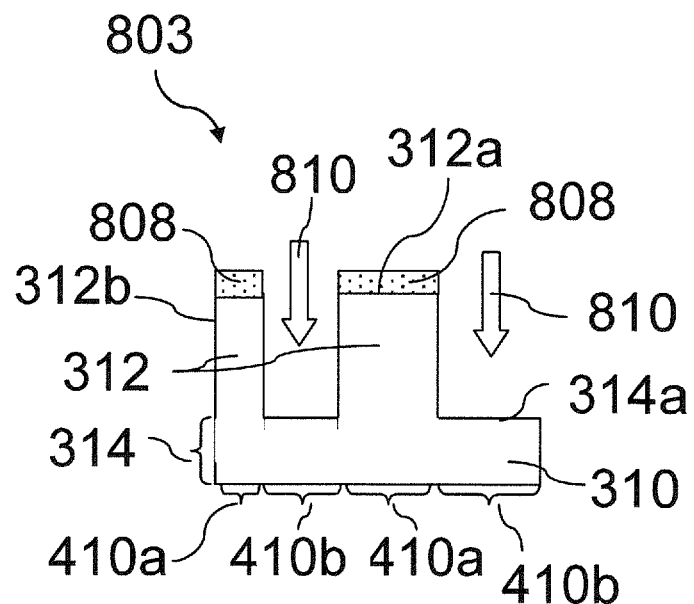

As shown in FIG. 8C in a view 803, patterning the substrate 310 may further include etching the substrate 310 (indicated by arrows 810) using the patterned mask layer 808 as an etch mask. Etching the substrate 310 may be performed using an etching process, for example, for example a wet etch process or a dry etch process, e.g. a plasma etch process (e.g. a Bosch etch process) or other suitable etching processes, which may be known as such in the art. Etching the substrate 310 may form at least one protrusion 312 (e.g. turret), for example a plurality of protrusions in some embodiments, and a base region 314 (e.g. base plate) from the substrate 310. The base region 314 may have a surface 314a, and the at least one protrusion 312 may have a surface 312a, 312b, including e.g. a surface 312a (e.g. top surface) facing away from the base region 314 and one or more sidewalls 312b.

Figure 8D:
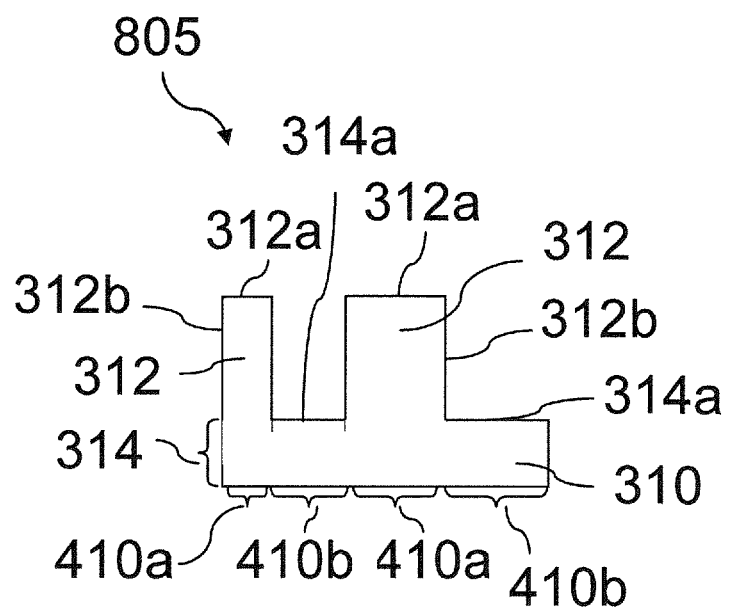

As shown in FIG. 8D in a view 805, patterning the substrate 310 may further include removing the patterned mask layer 808 (e.g. patterned photo-resist) from the surface 312a of the at least one protrusion 312 (e.g. a top surface) after forming the at least one protrusion 312 and the base region 314 of the substrate 310. Removing the patterned mask layer 808 after etching the substrate 310 may be performed using an etching process, for example, at least one of a wet etch process, a dry etch process, a plasma etch process, or other suitable etching processes, which may be known as such in the art.

Illustratively, FIG. 8D shows a patterned substrate 310 including a base region 314 and at least one protrusion 312, where the surface 312a, 312b of the at least one protrusion 312 may constitute a first portion 410a of the surface of the patterned substrate 310, and the surface 314a of the base region 314 may constitute a second portion 410b of the surface of the patterned substrate 310.

The method for manufacturing a battery electrode may further include forming a first diffusivity changing region 497 at the first portion 410a of the surface of the patterned substrate 310. In accordance with an embodiment, forming the first diffusivity changing region 497 at the first portion 410a of the surface may include forming the first diffusivity changing region 497 at the surface 312a, 312b of the at least one protrusion 312, for example, at one or more sidewalls 312b and/or a surface 312a facing away from the base region 314 (e.g. a top surface of the at least one protrusion 312).

Figure 8E:
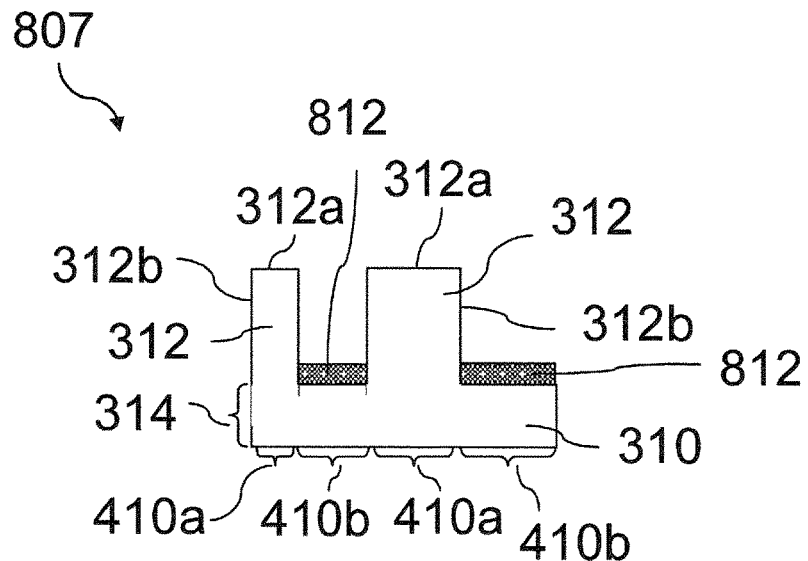

As shown in FIG. 8E in a view 807, forming the first diffusivity changing region 497 at the surface 312a, 312b of the at least one protrusion 312 may include forming (e.g. by means of a deposition process) a mask layer 812 (for example, a resist layer) over the surface 314a of the base region 314, after patterning the substrate 310. In one or more embodiments, the mask layer 812 may be a recessed mask layer (as shown in FIG. 8E) that may be used to mask the base region 314 (e.g. a base plate) of the substrate 310 (e.g. silicon substrate).

In one or more embodiments, depositing the mask layer 812 over the surface 314a of the base region 314 may be performed using a deposition process such as, for example, at least one of a chemical vapor deposition (CVD) process, a low-pressure CVD (LPCVD) process, a plasma-enhanced chemical vapor deposition (PECVD) process, a high-density plasma chemical vapor deposition (HDP-CVD) process, a physical vapor deposition (PVD) process, a sputtering process, and a spin coating process, or other suitable deposition processes, which may be known as such in the art.

Figure 8F:
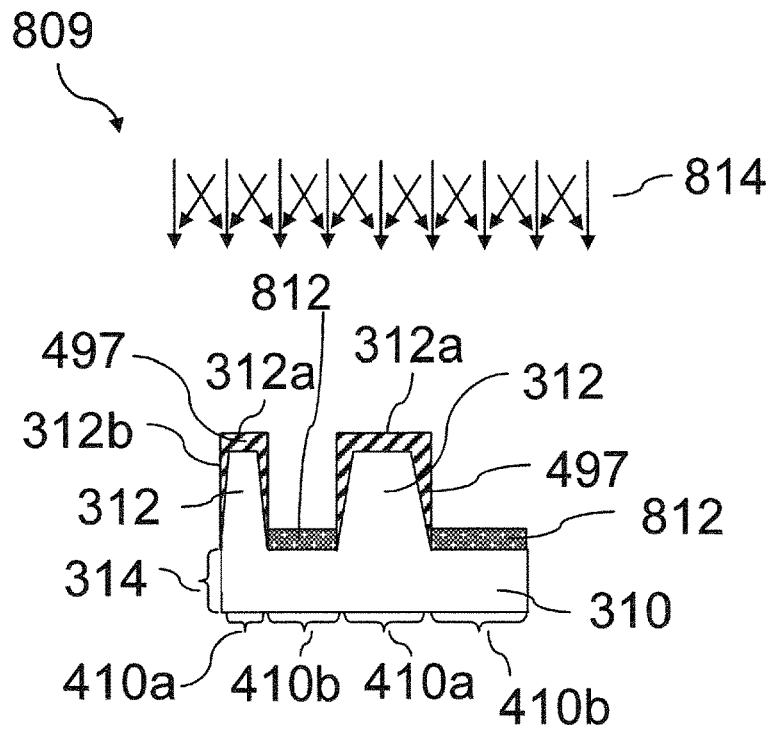

As shown in FIG. 8F in a view 809, forming the first diffusivity changing region 497 at the surface 312a 312b of the at least one protrusion 312 may include implanting ions into the at least one protrusion 312, for example into the surface 312a, 312b of the at least one protrusion 312, (indicated by arrows 814) using the mask layer 812 as an implantation mask. Therefore, prominent parts of the substrate 310 (e.g. the at least one protrusion 312), may be implanted with ions, whilst recessed areas of the substrate 310 (e.g. the surface 314a of the base region 314 covered by the mask layer 812) are not implanted with ions.

In accordance with an embodiment, the substrate 310 may be a doped substrate and implanting ions into the at least one protrusion 312 may include implanting counter-doping ions. For example, in accordance with an embodiment, implanting ions into the at least one protrusion 312 may include implanting p-type counter-doping ions into an n-type doped substrate 310, or vice versa. In accordance with an embodiment, the counter-doping ions may include, or may be ions of at least one of the following materials: boron, aluminium, gallium, indium, antimony, phosphorus, arsenic, and antimony, although other materials may be possible as well in accordance with other embodiments. By way of an example, the substrate 310 may be a silicon substrate doped with a p-type dopant such as boron, and the counter-doping ions implanted into the at least one protrusion 312 may be n-type dopant ions such as phosphorous, arsenic or antimony ions.

In accordance with another embodiment, implanting ions into the at least one protrusion 312 may include implanting protons into the at least one protrusion 312 (e.g. by means of a high-energy proton implantation process).

In accordance with one or more embodiments, implanting the ions into the at least one protrusion 312 may form an amorphized region in the at least one protrusion 312 of the substrate 310. In accordance with one or more embodiments, implanting the ions into the at least one protrusion 312 may damage the lattice structure in the surface 312a, 312b of the at least one protrusion 312, thus forming the amorphized region. As described above, the amorphized region may enhance (e.g. increase and/or facilitate) the diffusion of ions carried by the electrolyte 308 (e.g. lithium ion-carrying electrolyte) into the substrate 310. Accordingly, the first diffusivity changing region 497 formed by implanting ions into the substrate 310 (e.g. into the at least one protrusion 312 of the substrate 310) may be configured to enhance (e.g. increase and/or facilitate) the diffusion of ions carried by the electrolyte 308 (e.g. lithium ion-carrying electrolyte) into the substrate 310, for example into the at least one protrusion 312 of the substrate 310.

In accordance with an embodiment, implanting the ions into the substrate 310 (e.g. into the at least one protrusion 312 of the substrate 310) may include a tilted implantation (as shown by arrows 814 in FIG. 8F). The term "tilted implantation" may, for example, include or refer to an implantation that is carried out at a non-zero implantation angle, e.g. less than or equal to about 80°, e.g. an angle in the range from about 10° to about 80°, for example an angle of about 15°, or about 30°, or about 45°, or about 60°, with respect to a surface normal, although other implantation angles may be possible as well. In accordance with an embodiment, a tilted implantation into the sidewalls 312b of the at least one protrusion 312 (e.g. turret) may form an amorphized region having a graded thickness at the sidewalls 312b. The graded thickness of the amorphized region may, for example, serve to smoothly fade out the diffusion enhancing effect, as described above in connection with FIGS. 4A and 4B.

Figure 8G:
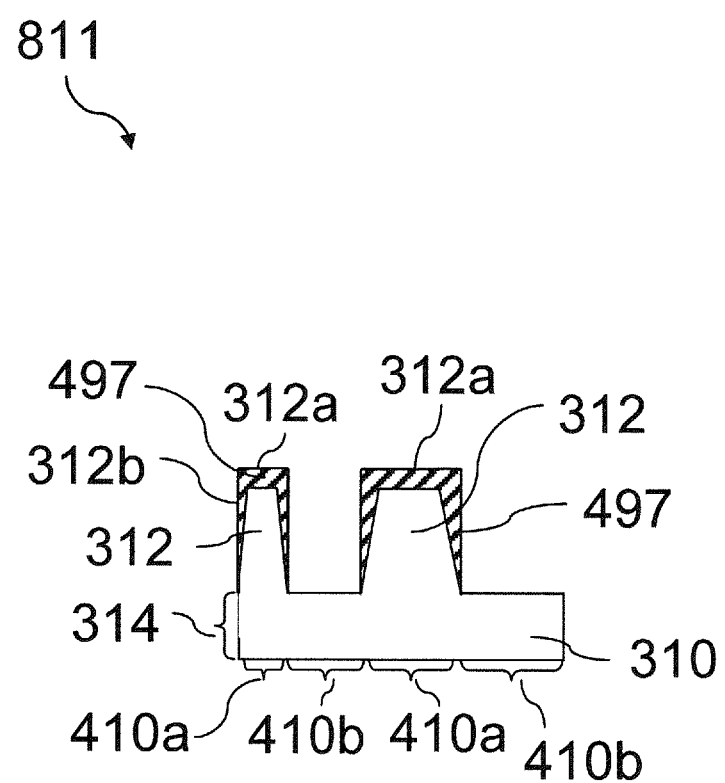

In accordance with an embodiment, the method for manufacturing a battery electrode may further include removing the mask layer 812 (e.g. by means of a standard resist removal process) after implanting the ions into the at least one protrusion 312 (as shown in a view 811 in FIG. 8G).

FIG. 9A to FIG. 9E show various cross-sectional views illustrating a method for manufacturing a battery electrode according to various embodiments and may, for example, be used to manufacture battery electrode 300 shown in FIG. 3A.

Figure 9A:
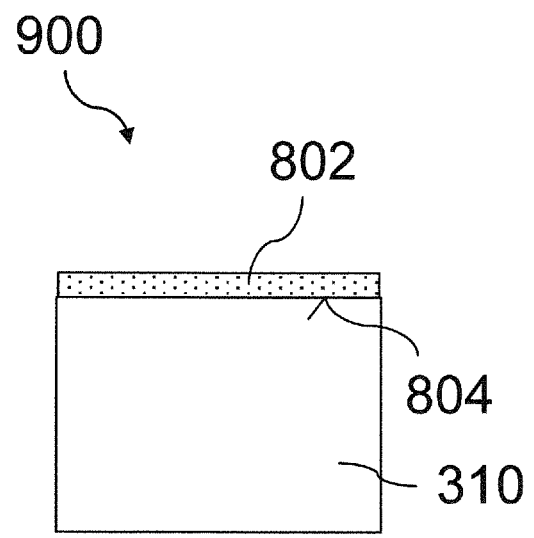
FIG. 9A to FIG. 9E show various cross-sectional views illustrating a method for manufacturing a battery electrode according to various embodiments.
Figure 9B:
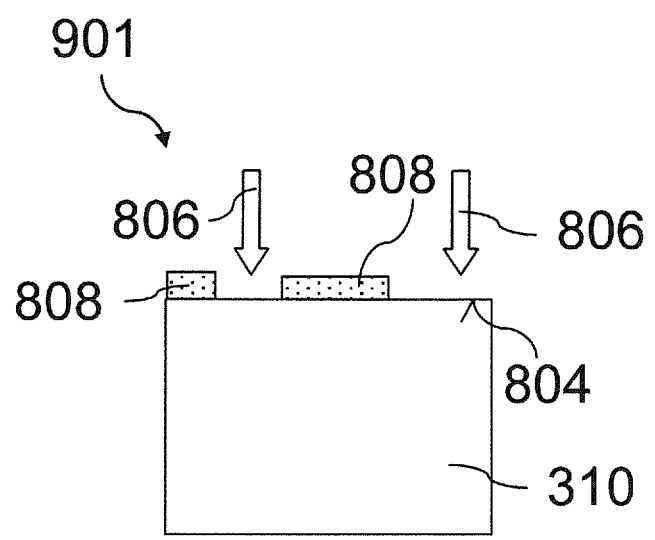
Figure 9C:
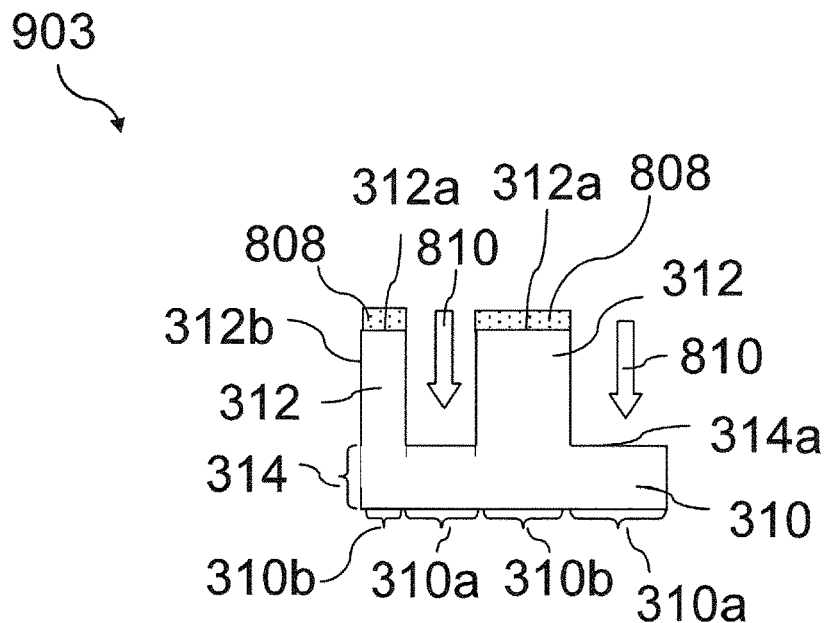

The method is to some extent similar to the method described above in connection with FIG. 8A to FIG. 8G. In particular, reference signs in FIG. 9A to FIG. 9E that are the same as in FIG. 3A and in FIG. 8A to FIG. 8G denote the same or similar elements as in FIG. 3A and in FIG. 8A to FIG. 8G. Thus, those elements will not be described in detail again here; reference is made to the description above. In particular, the method may include patterning a substrate 310 before forming a first diffusivity changing region 397 at a first portion 310a of the substrate 310, as shown in FIG. 9A to 9C. In one or more embodiments, the substrate 310 may be a doped substrate (e.g. doped semiconductor substrate, e.g. doped silicon substrate).

FIG. 9A shows a view 900 illustrating the patterning of a substrate 310. In accordance with an embodiment, patterning the substrate 310 may include forming a mask layer 802 (e.g. a resist layer, e.g. a photo-resist layer) over the surface 804 of substrate 310 configured to face an ion-carrying electrolyte (e.g. the electrolyte 308 shown in FIG. 3A). The further features described above with regards to the mask layer 802 and the substrate 310 shown in FIG. 8A may be equally applicable for the mask layer 802 and the substrate 310 shown in FIG. 9A.

As shown in FIG. 9B in a view 901, patterning the substrate 310 may further include patterning (indicated by arrow 806) the mask layer 802 to remove a part of the mask layer 802 from the surface 804 of the substrate 310 to form a patterned mask layer 808. The further features described above with regards to the patterned mask layer 808 shown in FIG. 8B may be equally applicable for the patterned mask layer 808 shown in FIG. 9B.

As shown in FIG. 9C in a view 903, patterning the substrate 310 may further include etching the substrate 310 (indicated by arrows 810) using the patterned mask layer 808 as an etch mask. The further features described above with regards to etching the substrate 310 (indicated by arrows 810) shown in FIG. 8C may be equally applicable for etching the substrate 310 (indicated by arrows 810) shown in FIG. 9C. Etching the substrate 310 may form at least one protrusion 312 (e.g. turret), for example a plurality of protrusions in some embodiments, and a base region 314 (e.g. base plate) from the substrate 310. The base region 314 may have a surface 314a, and the at least one protrusion may have a surface 312a, 312b, including e.g. a surface 312a (e.g. top surface) facing away from the base region 314 and one or more sidewalls 312b.

Illustratively, FIG. 9C shows a patterned substrate 310 including a base region 314 and at least one protrusion 312, where the surface 314a of the base region 314 may constitute a first portion 310a of the surface of the patterned substrate 310, and the surface 312a, 312b of the at least one protrusion 312 may constitute a second portion 310b of the surface of the patterned substrate 310.

The method for manufacturing a battery electrode may further include forming a first diffusivity changing region 397 at the first portion 310a of the surface of the patterned substrate 310. In accordance with an embodiment, forming the first diffusivity changing region 397 at the first portion 310a of the surface 312a, 312b, 314a may include, or may consist of, forming the first diffusivity changing region 397 at the surface 314a of the base region 314 of the substrate 310.

Figure 9D:
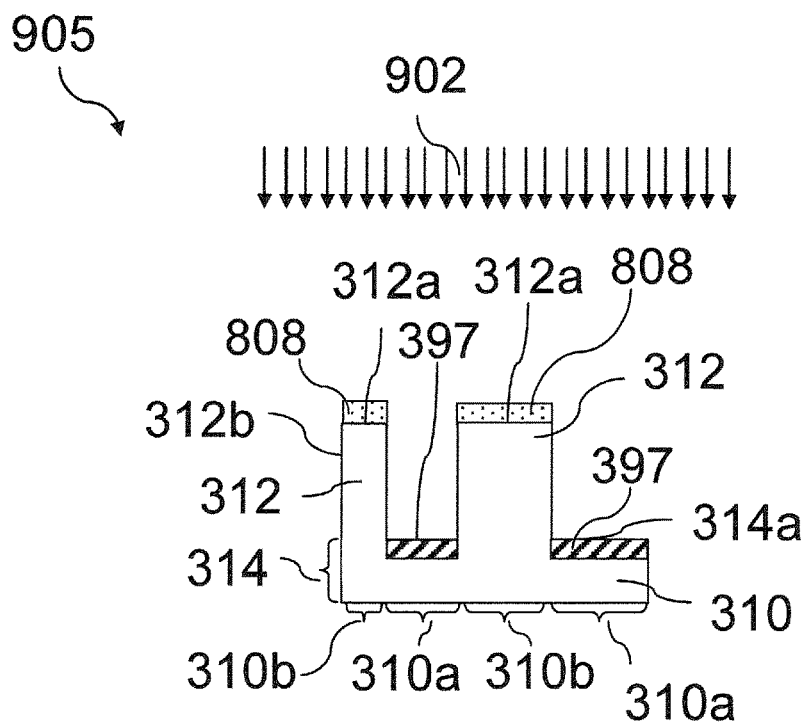

As shown in FIG. 9D in a view 905, forming the first diffusivity changing region 397 at the surface 314a of the base region 314 may include implanting ions (e.g. dopant ions, for example, n-type dopants, or p-type dopants, or counter-dopant ions) (indicated by arrows 902) into the base region 314 of the substrate 310. In accordance with an embodiment, the patterned mask layer 808 may be used as an implantation mask to allow ions to be implanted into the base region 314 of the substrate 310, and not into the surface 312a, 312b of the at least one protrusion 312 of the substrate 310. For example, ion implantation (indicated by arrows 902) may follow directly after patterning the substrate (e.g. surface structure etching) by using the patterned mask layer 808 as an implantation mask. Accordingly, the surface 312a (e.g. top surface) of the at least one protrusion 312 (e.g. turret) may be protected against ion implantation.

In accordance with an embodiment, ions used in the ion implantation may include, or may be ions of at least one of the following materials: boron, aluminium, gallium, indium, antimony, phosphorus, arsenic, and antimony, although other materials may be possible as well in accordance with other embodiments. By way of an example, the substrate 310 may be a silicon substrate doped with a p-type dopant such as boron, and the ions implanted into the base region 314 may be n-type counter-doping ions such as phosphorous, arsenic or antimony ions.

Figure 9E:
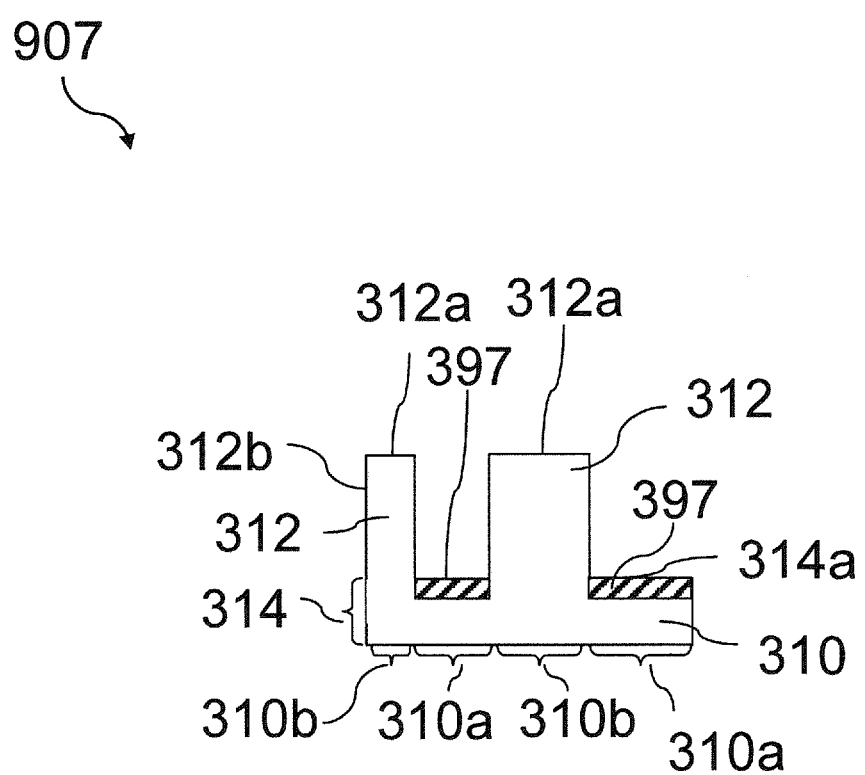

In accordance with an embodiment, forming the first diffusivity changing region 397 at the base region 314 of the substrate 310 may include removing the patterned mask layer 808 (e.g. by means of a standard resist strip process) after implanting the ions into the base region 314 (as shown in a view 907 in FIG. 9E).

In accordance with an embodiment, forming the first diffusivity changing region 397 at the base region 314 of the substrate 310 may further include annealing the substrate 310 after implanting the ions into the base region 314 of the substrate 310. In accordance with an embodiment, annealing the substrate 310 after implanting the ions may cause the implanted ions to form an electric potential barrier or a diffusion bather to the diffusion of ions (e.g. lithium ions) from the electrolyte (e.g. lithium ion-carrying electrolyte) into the base region 314 of the substrate 310. In accordance with an embodiment, annealing the substrate 310 after implanting the ions may heal damage to the lattice structure in the surface 314a of the base region 314 caused by implanting ions into the base region 314 of the substrate 310, thus forming an electric potential barrier or a diffusion barrier to the diffusion of ions.

FIG. 10A to FIG. 10H show various cross-sectional views illustrating a method for manufacturing a battery electrode according to various embodiments.

The method is to some extent similar to the method described above in connection with FIG. 9A to FIG. 9D and may, for example, be used to manufacture battery electrode 500 shown in FIG. 5. In particular, reference signs in FIG.

Figure 10A:
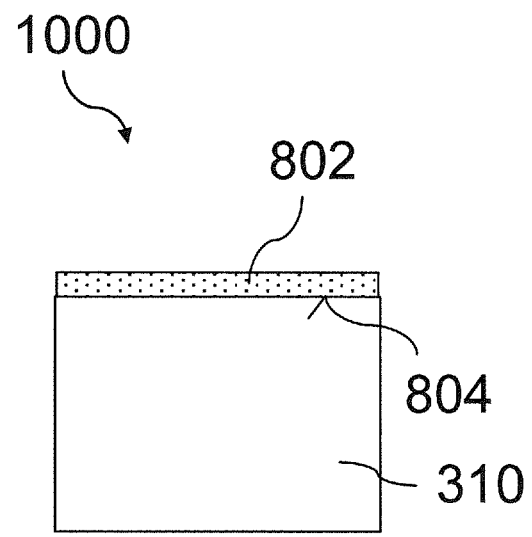
FIG. 10A to FIG. 10H show various cross-sectional views illustrating a method for manufacturing a battery electrode according to various embodiments.
Figure 10B:
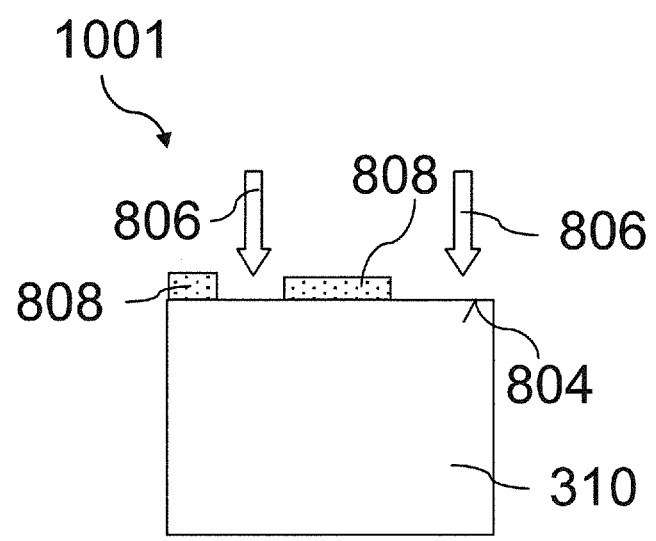
Figure 10C:
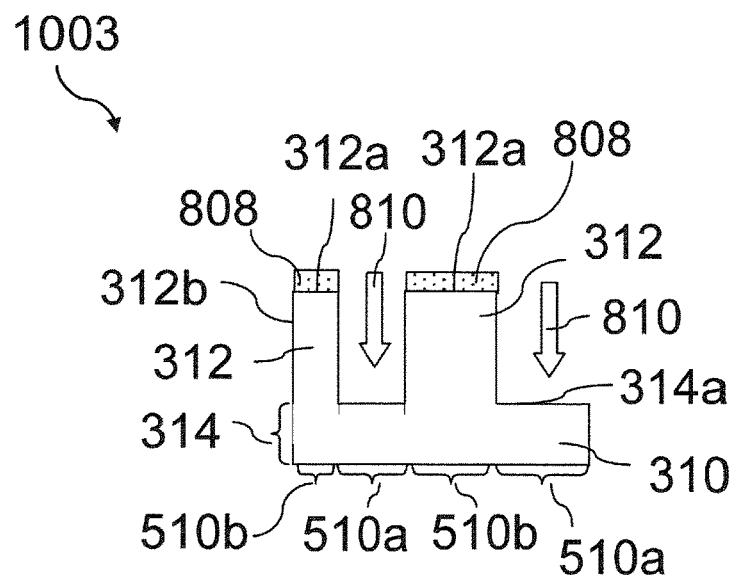
Figure 10D:
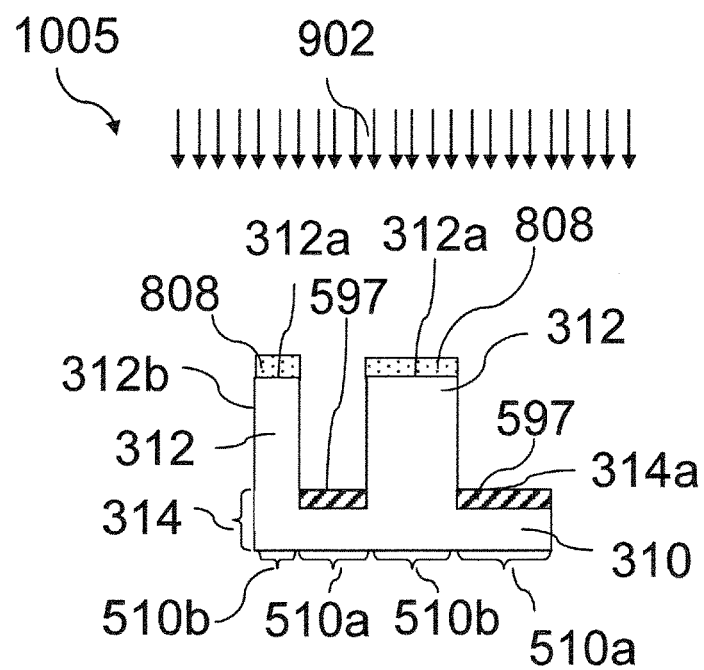
Figure 10E:
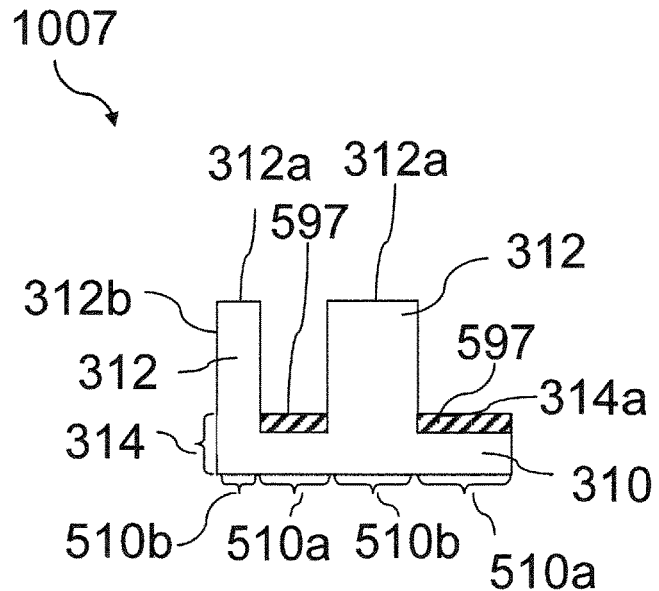
Figure 10F:
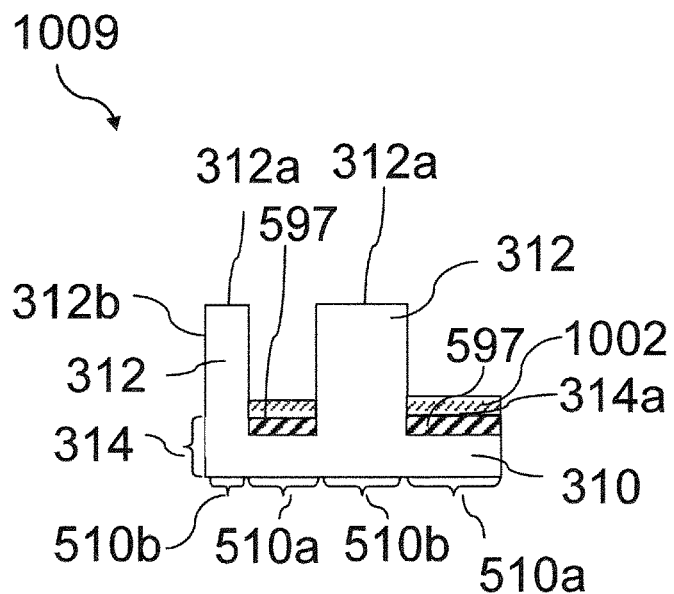
Figure 10G:
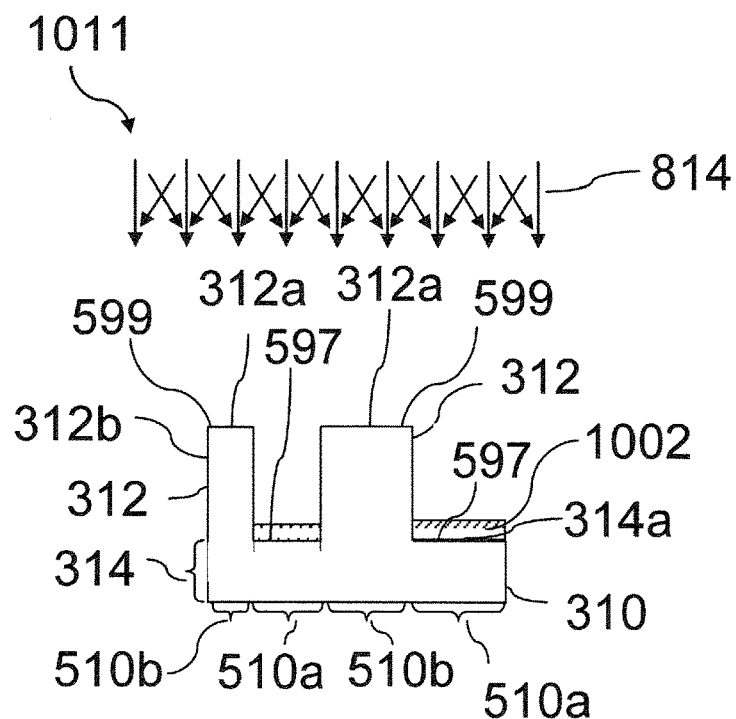
Figure 10H:
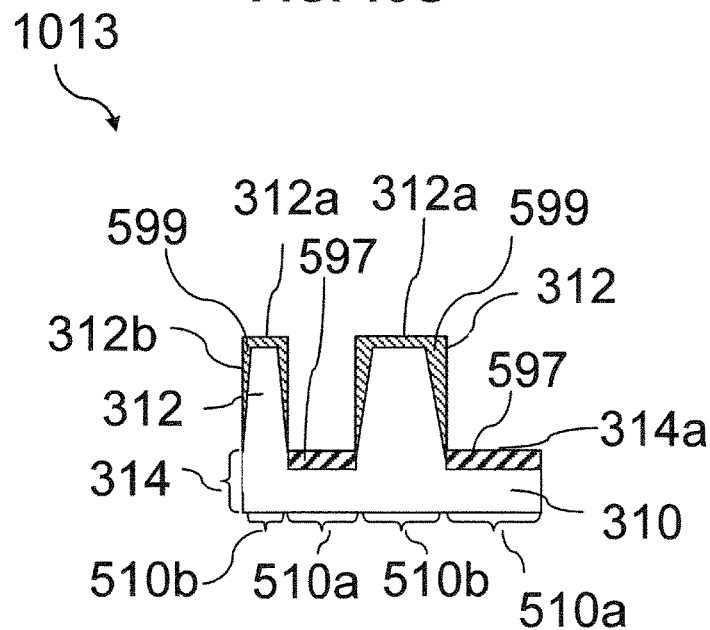

10A to FIG. 10H that are the same as in FIG. 5 and in FIG. 9A to FIG. 9E denote the same or similar elements as in FIG. 5 and FIG. 9A to FIG. 9e. Thus, those elements will not be described in detail again here; reference is made to the description above. In particular, the method may include patterning a substrate 310 (e.g. doped substrate, e.g. doped semiconductor substrate, e.g. doped silicon substrate) before forming a first diffusivity changing region 597 at a first portion 510a of the substrate 310 and forming a second diffusivity changing region 599 at a second portion 510b of the substrate 310.

FIG. 10A shows a view 1000 illustrating the patterning of a substrate 310. In accordance with an embodiment, patterning the substrate 310 may include depositing a mask layer 802 (e.g. a resist layer, e.g. a photo-resist layer) over a surface 804 of the substrate 310 configured to face an ion-carrying electrolyte (e.g. the electrolyte 308 shown in FIG. 5). The further features described above with regards to the mask layer 802 and the substrate 310 shown in FIG. 9A may be equally applicable for the mask layer 802 and the substrate 310 shown in FIG. 10A.

As shown in FIG. 10B in a view 1001, patterning the substrate 310 may further include patterning (indicated by arrows 806) the mask layer 802 to remove a part of the mask layer 802 from the surface 804 of the substrate 310 to form a patterned mask layer 808. The further features described above with regards to the patterned mask layer 808 shown in FIG. 9B may be equally applicable for the patterned mask layer 808 shown in FIG. 10B.

As shown in FIG. 10C in a view 1003, patterning the substrate 310 may further include etching the substrate 310 (indicated by arrows 810) using the patterned mask layer 808 as an etch mask. The further features described above with regards to etching the substrate 310 (indicated by arrows 810) shown in FIG. 9C may be equally applicable for etching the substrate 310 (indicated by arrows 810) shown in FIG. 10C. Etching the substrate 310 may form at least one protrusion 312 (e.g. turret), for example a plurality of protrusions in some embodiments, and a base region 314 (e.g. base plate) from the substrate 310. The base region 314 may have a surface 314a, and the at least one protrusion may have a surface 312a, 312b, including e.g. a surface 312a (e.g. top surface) facing away from the base region 314 and one or more sidewalls 312b.

Illustratively, FIG. 10C shows a patterned substrate 310 including a base region 314 and at least one protrusion 312, where the surface 314a of the base region 314 may constitute a first portion 510a of the surface of the patterned substrate 310, and the surface 312a, 312b of the at least one protrusion 312 may constitute a second portion 510b of the surface of the patterned substrate 310.

The method for manufacturing a battery electrode may further include forming a first diffusivity changing region 597 at the first portion 510a of the surface of the substrate 310, and forming a second diffusivity changing region 599 at the second portion 510b of the surface of the substrate 310. In accordance with an embodiment, forming the first diffusivity changing region 597 at the first portion 510a of the surface of the substrate 310 may include, or may consist of, forming the first diffusivity changing region 597 at the surface 314a of the base region 314 of the substrate 310, and forming the second diffusivity changing region 599 at the second portion 510b of the surface of the substrate 310 may include, or may consist of, forming the second diffusivity changing region 599 at the surface 312a, 312b of the at least one protrusion 312, for example, at one or more sidewalls 312b and/or a surface 312a facing away from the base region 314 (e.g. a top surface of the at least one protrusion 312).

As shown in FIG. 10D in a view 1005, forming the first diffusivity changing region 597 at the first portion 510a of the surface of the substrate 310 (e.g. at the surface 314a of the base region 314) may include implanting ions (e.g. dopant ions, for example, n-type dopants, or p-type dopants, or counter-dopant ions) (indicated by arrows 902) into the base region 314 of the substrate 310. In accordance with an embodiment, the patterned mask layer 808 may be used as an implantation mask to allow ions to be implanted into the base region 314 of the substrate 310, and not into the surface 312a, 312b of the at least one protrusion 312 of the substrate 310. The further features described above with regards to implanting ions into the base region 314 of the substrate (indicated by arrows 902) in FIG. 9D may be equally applicable for implanting ions into the base region 314 of the substrate (indicated by arrows 902) shown in FIG. 10D.

As shown in FIG. 10E in a view 1007, the patterned mask layer 808 may be removed after implanting the ions (e.g. dopant ions, for example, n-type dopants, or p-type dopants, or counter-dopant ions) into the base region 314 of the substrate 310, for example by means of etching, e.g. using a standard resist strip process.

In accordance with an embodiment, forming the first diffusivity changing region 597 may further include annealing the substrate 310 after implanting the ions (e.g. dopant ions, for example, n-type dopants, or p-type dopants, or counter-dopant ions) into the base region 314 of the substrate 310, for example after the patterned mask layer 808 has been removed. In accordance with an embodiment, annealing the substrate 310 may form an electric potential barrier or a diffusion barrier to the diffusion of ions (e.g. lithium ions) from the electrolyte (e.g. lithium ion-carrying electrolyte) into the base region 314 of the substrate 310.

As shown in FIG. 10F in a view 1009, forming the second diffusivity changing region 599 at the second portion 510b of the surface of the substrate 310, e.g. at the surface 312a, 312b of the at least one protrusion 312, may include forming a mask layer 1002 over the surface 314a of the base region 314. The mask layer 1002 formed over the surface 314a of the base region 314 may be formed over the first diffusivity changing region 597. The further features described above with regards to the mask layer 812 shown in FIG. 8E may be equally applicable for the mask layer 1002 shown in FIG. 10F.

As shown in FIG. 10G in a view 1011, forming the second diffusivity changing region 599 at the second portion 510b of the surface of the substrate 310, e.g. at the surface 312a 312b of the at least one protrusion 312, may include implanting ions (e.g. dopant ions, for example, n-type dopants, or p-type dopants, or counter-dopant ions) into the at least one protrusion 312 using the mask layer 1002 as an implantation mask. The further features described above with regards to implanting ions into the at least one protrusion 312 (indicated by arrows 814) in FIG. 8F may be equally applicable for implanting ions into the at least one protrusion 312 (indicated by arrows 814) shown in FIG. 10G.

In accordance with one or more embodiments, the first diffusivity changing region 597 formed at the first portion 510a of the surface of the substrate 310, e.g. at the surface 314a of the base region 314, may be configured to reduce (e.g. decrease and/or retard) the diffusion of ions carried by the electrolyte 308 (e.g. lithium ion-carrying electrolyte) into the substrate 310, and the second diffusivity changing region 599 formed at the second portion 510b of the surface of the substrate 310, e.g. at the surface 312a, 312b of the at least one protrusion 312, may be configured to enhance (e.g. increase and/or facilitate) the diffusion of ions carried by the electrolyte 308 (e.g. lithium ion-carrying electrolyte) into the substrate 310.

In accordance with an embodiment, the substrate 310 may be a doped substrate, and the first diffusivity changing region 597 at the first portion 510a of the surface of the substrate 310, e.g. at the surface 314a of the base region 314 may include, or may consist of, a counter-doped region in the doped substrate 310, and the second diffusivity changing region 599 at the second portion 510b of the surface of the substrate 310, e.g. at the surface 312a, 312b of the at least one protrusion 312, may include, or may consist of, an amorphized region in the doped substrate 310. In accordance with one or more embodiments, forming the counter-doped region in the substrate 310 may include implanting ions into the substrate 310 and subsequently annealing the substrate 310, while forming the amorphized region in the substrate 310 may include implanting ions into the substrate 310 without subsequent annealing.

In accordance with an embodiment, the mask layer 1002 may be removed after implanting ions (e.g. dopant ions, for example, n-type dopants, or p-type dopants, or counter-dopant ions, or protons) into the at least one protrusion 312 (as shown in a view 1013 in FIG. 10H).

Various embodiments may provide a battery.

Figure 11:
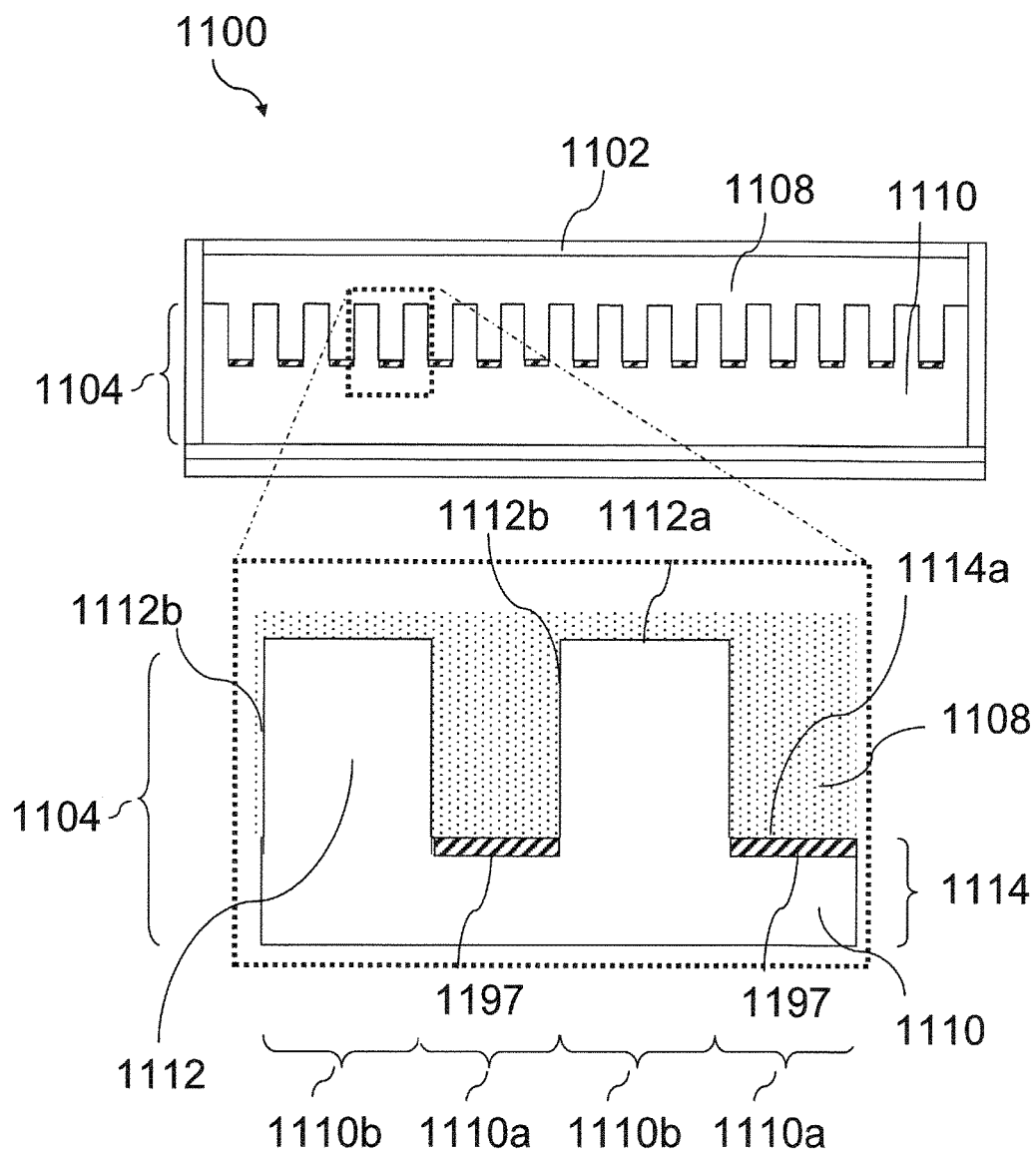
FIG. 11 shows a cross-sectional view illustrating a battery according to various embodiments.

FIG. 11 shows a cross-sectional view of a battery 1100 according to various embodiments.

In accordance with an embodiment, the battery 1100 may include an ion-carrying electrolyte 1108 and at least two battery electrodes 1102, 1104, for example an anode 1104 and a cathode 1102.

In accordance with an embodiment, at least one battery electrode (e.g the battery electrode 1104) of the at least two battery electrodes 1102, 1104 may include a substrate 1110. The substrate 1110 may include a surface 1112a, 1112b, 1114a facing the ion-carrying electrolyte 1108. The at least one battery electrode 1104 may include a first diffusivity changing region 1197 at a first portion 1110a of the surface 1112a, 1112b, 1114a. The first diffusivity changing region 1197 may be configured to change the diffusion of ions carried by the ion-carrying electrolyte 1108 into the substrate 1110. A second portion 1110b of the surface 1112a, 1112b, 1114a may be free from the first diffusivity changing region 1197 (as shown in FIG. 11). In accordance with an embodiment, the battery electrode 1100 may include a second diffusivity changing region at the second portion 1110b of the surface (not shown in FIG. 11, see e.g. FIG. 5). Although the first diffusivity changing region 1197 is shown in FIG. 11 to be at a surface 1114a of a base region 1114 of the substrate 1110, it should be understood that the first diffusivity changing region 1197 may also be at other parts of the surface 1112a, 1112b, 1114a of the substrate 1110, e.g. at a surface 1112a, 1112b of at least one protrusion 1112 of the substrate 1110 (not shown, see e.g. FIG. 4), in accordance with another embodiment. The battery 1100, or one or more parts of the battery 1100, e.g. the battery electrode 1104 and/or the ion-carrying electrolyte 1108, may, for example, be configured in accordance with one or more embodiments described herein.

According to one or more embodiments, a battery electrode may be provided. In one or more embodiments, the battery electrode may include: a substrate including a surface configured to face an ion-carrying electrolyte; and a first diffusivity changing region at a first portion of the surface, wherein the first diffusivity changing region may be configured to change diffusion of ions carried by the electrolyte into the substrate, and wherein a second portion of the surface may be free from the first diffusivity changing region.

In one or more embodiments, the substrate may include a semiconductor material.

In one or more embodiments, the semiconductor material may be selected from a group of materials, the group consisting of: silicon, germanium, gallium nitride, gallium arsenide, and silicon carbide.

In one or more embodiments, the substrate may include a material that has a maximum dilation of greater than or equal to about 5% when fully loaded with ions carried by the electrolyte.

In one or more embodiments, the battery electrode may be configured as an anode in a discharge mode.

In one or more embodiments, the ions carried by the electrolyte may include ions of at least one material selected from a group of materials, the group consisting of: an alkali metal, an alkaline earth metal, a chalcogen, and a halogen.

In one or more embodiments, the ions carried by the electrolyte may include ions of at least one material selected from a group of materials, the group consisting of: magnesium, sodium, lithium, potassium, calcium, oxygen, sulphur, chlorine, and fluorine.

In one or more embodiments, the first diffusivity changing region may be configured to reduce diffusion of ions carried by the electrolyte into the substrate.

In one or more embodiments, the substrate may be a doped substrate, and the first diffusivity changing region may include a counter-doped region in the doped substrate.

In one or more embodiments, the first diffusivity changing region may include a resist material.

In one or more embodiments, the first diffusivity changing region may include a metal or metal alloy.

In one or more embodiments, the first diffusivity changing region may be configured to enhance diffusion of ions carried by the electrolyte into the substrate.

In one or more embodiments, the first diffusivity changing region may include an amorphized region in the substrate.

In one or more embodiments, the battery electrode may further include: a second diffusivity changing region at the second portion of the surface, wherein the first diffusivity changing region may be configured to reduce diffusion of ions carried by the electrolyte into the substrate, and wherein the second diffusivity changing region may be configured to enhance diffusion of ions carried by the electrolyte into the substrate.

In one or more embodiments, the substrate may be a doped substrate, wherein the first diffusivity changing region may include a counter-doped region in the doped substrate, and wherein the second diffusivity changing region may include an amorphized region in the doped substrate.

In one or more embodiments, the first diffusivity changing region may have a thickness in the range from about 1 nm to about 10 μm.

In one or more embodiments, at least one of the first diffusivity changing region and the second diffusivity changing region may have a thickness in the range from about 1 nm to about 10 μm.

In one or more embodiments, the substrate may include a base region and at least one protrusion extending from the base region, and the surface configured to face the ion-carrying electrolyte may include a surface of the base region and a surface of the at least one protrusion.

In one or more embodiments, the first portion of the surface configured to face the ion-carrying electrolyte may include the surface of the base region, the second portion of the surface configured to face the ion-carrying electrolyte may include the surface of the at least one protrusion, and the first diffusivity changing region may be configured to reduce diffusion of ions carried by the electrolyte into the substrate.

In one or more embodiments, the first portion of the surface configured to face the ion-carrying electrolyte may include the surface of the at least one protrusion, the second portion of the surface configured to face the ion-carrying electrolyte may include the surface of the base region, and the first diffusivity changing region may be configured to enhance diffusion of ions carried by the electrolyte into the substrate.

In one or more embodiments, the first diffusivity changing region may have a graded thickness.

In one or more embodiments, the substrate may include a base region and at least one protrusion extending from the base region, the first portion of the surface configured to face the ion-carrying electrolyte may include a surface of the base region; and the second portion of the surface configured to face the ion-carrying electrolyte may include a surface of the at least one protrusion.

According to one or more embodiments, a battery may be provided. The battery may include an ion-carrying electrolyte; and at least two battery electrodes, wherein at least one battery electrode of the at least two battery electrodes may include: a substrate including a surface facing the ion-carrying electrolyte; and a first diffusivity changing region at a first portion of the surface, wherein the first diffusivity changing region may be configured to change diffusion of ions carried by the ion-carrying electrolyte into the substrate, wherein a second portion of the surface may be free from the first diffusivity changing region.

In one or more embodiments, the substrate of the battery electrode of the battery may include a base region and at least one protrusion extending from the base region, wherein the first portion of the surface configured facing the ion-carrying electrolyte may include a surface of the base region, wherein the second portion of the surface facing the ion-carrying electrolyte may include a surface of the at least one protrusion, and wherein the first diffusivity changing region may be configured to reduce diffusion of ions carried by the ion-carrying electrolyte into the substrate.

In one or more embodiments, the substrate of the battery electrode of the battery may be a doped semiconductor substrate, and wherein the first diffusivity changing region may include a counter-doped region in the base region.

In one or more embodiments, the substrate of the battery electrode of the battery may include a base region and at least one protrusion extending from the base region, wherein the first portion of the surface facing the ion-carrying electrolyte may include a surface of the at least one protrusion, wherein the second portion of the surface facing the ion-carrying electrolyte may include a surface of the base region, and wherein the first diffusivity changing region may be configured to enhance diffusion of ions carried by the ion-carrying electrolyte into the substrate.

In one or more embodiments, the first diffusivity changing region of the battery electrode of the battery may include an amorphized region in the at least one protrusion.

In one or more embodiments, the battery electrode of the battery may further include: a second diffusivity changing region at the second portion of the surface, wherein the first diffusivity changing region may be configured to reduce diffusion of ions carried by the ion-carrying electrolyte into the substrate, and wherein the second diffusivity changing region may be configured to enhance diffusion of ions carried by the ion-carrying electrolyte into the substrate.

In one or more embodiments, the substrate of the battery electrode of the battery may include a base region and at least one protrusion extending from the base region, wherein the first portion of the surface facing the ion-carrying electrolyte may include a surface of the base region, and wherein the second portion of the surface facing the ion-carrying electrolyte may include a surface of the at least one protrusion.

In one or more embodiments, the at least one battery electrode of the battery may be configured as an anode of the battery.

In one or more embodiments, the battery may be configured as a lithium-ion battery.

According to one or more embodiments, a method for manufacturing a battery electrode may be provided. In one or more embodiments, the method may include: providing a substrate including a surface configured to face an ion-carrying electrolyte; forming a first diffusivity changing region at a first portion of the surface of the substrate, wherein a second portion of the surface may remain free from the first diffusivity changing region, and wherein the first diffusivity changing region may be configured to change diffusion of ions carried by the electrolyte into the substrate.

In one or more embodiments, the substrate provided in the method may include a semiconductor material.

In one or more embodiments, the first diffusivity changing region may be configured to reduce diffusion of ions carried by the electrolyte into the substrate.

In one or more embodiments, the substrate may be a doped substrate, and wherein forming the first diffusivity changing region may include forming a counter-doped region in the doped substrate.

In one or more embodiments, forming the counter-doped region in the doped substrate may include implanting counter-doping ions into the doped substrate and annealing the substrate after implanting the counter-doping ions.

In one or more embodiments, the first diffusivity changing region may be configured to enhance diffusion of ions carried by the electrolyte into the substrate.

In one or more embodiments, forming the first diffusivity changing region may include forming an amorphized region in the substrate.

In one or more embodiments, forming the amorphized region in the substrate may include implanting ions into the substrate.

In one or more embodiments, the method may further include: forming a second diffusivity changing region at the second portion of the surface of the substrate, wherein the first diffusivity changing region may be configured to reduce diffusion of ions carried by the electrolyte into the substrate, and wherein the second diffusivity changing region may be configured to enhance diffusion of ions carried by the electrolyte into the substrate.

In one or more embodiments, the substrate may be a doped substrate, and forming the first diffusivity changing region may include forming a counter-doped region in the doped substrate, and forming the second diffusivity changing region may include forming an amorphized region in the doped substrate.

In one or more embodiments, the method may further include: patterning the substrate to have a base region and at least one protrusion extending from the base region, wherein the surface of the substrate configured to face the ion-carrying electrolyte may include a surface of the base region and a surface of the at least one protrusion, and wherein forming the first diffusivity changing region at the first portion of the surface of the substrate may include forming the first diffusivity changing region at the surface of the base region.

In one or more embodiments, patterning the substrate may include: forming (e.g. depositing) a mask layer (e.g. a resist layer) over the surface of the substrate configured to face the ion-carrying electrolyte; patterning (e.g etching) the mask layer to remove a part of the mask layer from the surface to form a patterned mask layer; and etching the substrate using the patterned mask layer as an etch mask to form the base region and the at least one protrusion.

In one or more embodiments, forming the first diffusivity changing region at the surface of the base region may include implanting ions into the base region and annealing the substrate after implanting the ions into the base region.

In one or more embodiments, implanting ions into the base region may include using the patterned mask layer as an implantation mask.

In one or more embodiments, the method may further include: patterning the substrate to have a base region and at least one protrusion extending from the base region, wherein the surface of the substrate configured to face the ion-carrying electrolyte may include a surface of the base region and a surface of the at least one protrusion, and wherein forming the first diffusivity changing region at the first portion of the surface of the substrate may include forming the first diffusivity changing region at the surface of the at least one protrusion.

In one or more embodiments, patterning the substrate may include: forming (e.g. depositing) a mask layer (e.g. a resist layer) over the surface of the substrate configured to face the ion-carrying electrolyte; patterning (e.g. etching) the mask layer to remove a part of the mask layer from the surface to form a patterned mask layer; etching the substrate using the patterned mask layer as an etch mask to form the base region and the at least one protrusion; and removing the patterned mask layer after etching the substrate.

In one or more embodiments, forming the first diffusivity changing region at the surface of the at least one protrusion of the substrate may include: forming a mask layer over the surface of the base region; and implanting ions into the at least one protrusion using the mask layer as an implantation mask.

In one or more embodiments, implanting the ions into the at least one protrusion may include a tilted implantation of the ions into the at least one protrusion.

In one or more embodiments, the method may further include: patterning the substrate to have a base region and at least one protrusion extending from the base region, wherein the surface of the substrate configured to face the ion-carrying electrolyte may include a surface of the base region and a surface of the at least one protrusion, wherein forming the first diffusivity changing region at the first portion of the surface of the substrate may include forming the first diffusivity changing region at the surface of the base region, and wherein forming the second diffusivity changing region at the second portion of the surface of the substrate may include forming the second diffusivity changing region at the surface of the at least one protrusion.

In one or more embodiments, patterning the substrate may include: forming (e.g. depositing) a mask layer (e.g. resist layer) over the surface of the substrate configured to face the ion-carrying electrolyte; patterning (e.g. etching) the mask layer to remove a part of the mask layer from the surface to form a patterned mask layer; and etching the substrate using the patterned mask layer as an etch mask to form the base region and the at least one protrusion.

In one or more embodiments, forming the first diffusivity changing region at the surface of the base region may include: implanting ions into the base region using the patterned mask layer as an implantation mask; and annealing the substrate after implanting the ions into the base region, before forming the second diffusivity changing region at the surface of the at least one protrusion.

In one or more embodiments, forming the second diffusivity changing region at the surface of the at least one protrusion may include: forming a mask layer over the surface of the first diffusivity layer formed at the surface of the base region; and implanting ions into the at least one protrusion using the mask layer as an implantation mask.

While various aspects of this disclosure have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A battery electrode, comprising:
   a doped substrate comprising a surface configured to face an ion-carrying electrolyte during operation of the battery electrode, wherein the doped substrate comprises a first conductivity type and wherein the doped substrate is a doped integral semiconductor substrate; and
   a first diffusivity changing region at a first portion of the surface of the doped substrate, the first diffusivity changing region comprising a thermally activated counter-doped region in the doped substrate, the thermally activated counter doped semiconductor region comprising a second conductivity type, wherein the first diffusivity changing region is configured to change diffusion of ions carried by the electrolyte into the doped substrate, and
   wherein a second portion of the surface of the doped substrate is exposed and free from the first diffusivity changing region and comprises the first conductivity type, and
   wherein the second conductivity type is opposite the first conductivity type.

2. The battery electrode of claim 1,
   wherein the doped substrate comprises a material is selected from a group of materials, the group consisting of: silicon, germanium, gallium nitride, gallium arsenide, and silicon carbide.

3. The battery electrode of claim 1,
   wherein the doped substrate comprises a material that has a maximum dilation of greater than or equal to about 5% when fully loaded with ions carried by the electrolyte.

4. The battery electrode of claim 1,
   wherein the battery electrode is configured as an anode in a discharge mode.

5. The battery electrode of claim 1,
   wherein the ions carried by the electrolyte comprise ions of at least one material selected from a group of materials, the group consisting of: an alkali metal, an alkaline earth metal, a chalcogen, and a halogen.

6. The battery electrode of claim 1,
wherein the ions carried by the electrolyte comprise ions of at least one material selected from a group of materials, the group consisting of: magnesium, sodium, lithium, potassium, calcium, oxygen, sulphur, chlorine, and fluorine.

7. The battery electrode of claim 1, further comprising:
a second diffusivity changing region at the second portion of the surface,
wherein the first diffusivity changing region is configured to reduce diffusion of ions carried by the electrolyte into the doped substrate, and
wherein the second diffusivity changing region is configured to enhance diffusion of ions carried by the electrolyte into the doped substrate.

8. The battery electrode of claim 1,
wherein the first diffusivity changing region has a thickness in the range from about 1 nm to about 10 μm.

9. The battery electrode of claim 7,
wherein at least one of the first diffusivity changing region and the second diffusivity changing region has a thickness in the range from about 1 nm to about 10 μm.

10. The battery electrode of claim 1,
wherein the doped substrate comprises a base region and at least one protrusion extending from the base region,
wherein the surface configured to face the ion-carrying electrolyte comprises a surface of the base region and a surface of the at least one protrusion.

11. The battery electrode of claim 10,
wherein the first portion of the surface configured to face the ion-carrying electrolyte comprises the surface of the base region,
wherein the second portion of the surface configured to face the ion-carrying electrolyte comprises the surface of the at least one protrusion, and
wherein the first diffusivity changing region is configured to reduce diffusion of ions carried by the electrolyte into the doped substrate.

12. The battery electrode of claim 7,
wherein the doped substrate comprise a base region and at least one protrusion extending from the base region;
wherein the first portion of the surface configured to face the ion-carrying electrolyte comprises a surface of the base region; and
wherein the second portion of the surface configured to face the ion-carrying electrolyte comprises a surface of the at least one protrusion.

13. A battery, comprising:
an ion-carrying electrolyte; and
at least two battery electrodes, wherein at least one battery electrode of the at least two battery electrodes comprises:
 a doped substrate comprising a surface facing the ion-carrying electrolyte wherein the doped substrate comprises a first conductivity type; and
 a first diffusivity changing region at a first portion of the surface of the doped substrate, the first diffusivity changing region comprising a thermally activated counter-doped region in the doped substrate, the thermally activated counter doped region comprising a second conductivity type, wherein the first diffusivity changing region is configured to change diffusion of ions carried by the ion-carrying electrolyte into the doped substrate,
wherein a second portion of the surface of the doped substrate is free from the first diffusivity changing region and comprises the first conductivity type.

14. The battery of claim 13,
wherein the doped substrate comprises a base region and at least one protrusion extending from the base region,
wherein the first portion of the surface facing the ion-carrying electrolyte comprises a surface of the base region,
wherein the second portion of the surface facing the ion-carrying electrolyte comprises a surface of the at least one protrusion, and
wherein the first diffusivity changing region is configured to reduce diffusion of ions carried by the ion-carrying electrolyte into the doped substrate.

15. The battery of claim 14,
wherein the second portion of the surface of the doped substrate comprises a second diffusivity changing region, the second diffusivity changing region comprising an amorphized region in the at least one protrusion.

16. The battery of claim 15,
wherein the first diffusivity changing region is configured to reduce diffusion of ions carried by the ion-carrying electrolyte into the doped substrate, and
wherein the second diffusivity changing region is configured to enhance diffusion of ions carried by the ion-carrying electrolyte into the doped substrate.

17. The battery of claim 13,
wherein the at least one battery electrode is configured as an anode of the battery.

18. The battery of claim 13,
configured as a lithium-ion battery.

19. A battery electrode, comprising:
a doped substrate comprising a surface configured to face an ion-carrying electrolyte during operation of the battery electrode, wherein the doped substrate comprises a base region and at least two protrusions having exposed sidewalls and exposed top surfaces extending from the base region, wherein the surface of the doped substrate comprises a surface of the base region between the at least two protrusions and comprises the sidewalls and top surfaces of the at least two protrusions, and wherein in an uncharged state of the battery electrode, the surface of the doped substrate has a non-planar shape; and
a first diffusivity changing region at the surface of the base region between the at least two protrusions, the first diffusivity changing region comprising a photoresist material, wherein the first diffusivity changing region is configured to change diffusion of ions carried by the electrolyte into the doped substrate, and
wherein the sidewalls and top surfaces of the at least two protrusions and a region of the doped substrate underneath the at least two protrusions are free from the first diffusivity changing region,
wherein a portion of the surface of the doped semiconductor substrate comprising the base region comprises a first conductivity type and a portion of the surface of the doped substrate including at least the top surfaces of the at least two protrusions comprises a second conductivity type that is opposite the first conductivity type, and
wherein the doped substrate is a doped integral semiconductor substrate.

20. A battery electrode, comprising:
a doped substrate comprising a surface configured to face an ion-carrying electrolyte during operation of the battery electrode, wherein the doped substrate comprises a base region and at least two protrusions having exposed sidewalls and top surfaces and extending from the base region, wherein the surface of the doped substrate comprises a surface of the base region between the at least two protrusions and comprises the sidewalls and top surfaces of the least two protrusions, and wherein in an uncharged state of the battery electrode, the surface of the doped substrate has a non-planar shape; and a first diffusivity changing region at the surface of the base region between the at least two protrusions, the first diffusivity changing region comprising a metal or metal alloy, wherein the first diffusivity changing region is configured to change diffusion of ions carried by the electrolyte into the doped substrate and wherein the first diffusivity region comprises a first conductivity type, and wherein the sidewalls and top surfaces of the at least two protrusions and portions of the base region underneath the at least two protrusions are free from the first diffusivity changing region and comprises a second conductivity type that is opposite the first conductivity type, and wherein the doped substrate is a doped integral semiconductor substrate.

21. A battery electrode, comprising:
a doped substrate comprising a surface, the surface comprising one or more exposed portions configured to face an ion-carrying electrolyte;
a first diffusivity changing region at a first portion of the surface of the doped substrate, the first diffusivity changing region comprising an amorphized region in the doped substrate and comprising a first conductivity type, wherein the first diffusivity changing region is configured to change diffusion of ions carried by the electrolyte into the doped substrate; and
a second diffusivity changing region at a second portion of the surface of the doped substrate, the second diffusivity changing region comprising a thermally activated counter-doped region in the doped substrate, the counter-doped region comprising a second conductivity type that is opposite the first conductivity type.

22. The battery electrode of claim 21,
wherein the doped substrate comprises a base region and at least one protrusion extending from the base region;
wherein the first portion of the surface configured to face the ion-carrying electrolyte comprises the surface of the at least one protrusion,
wherein the second portion of the surface configured to face the ion-carrying electrolyte comprises the surface of the base region, and
wherein the first diffusivity changing region is configured to enhance diffusion of ions carried by the electrolyte into the substrate.

23. The battery electrode of claim 22,
wherein the first diffusivity changing region comprises a graded thickness.

24. A battery, comprising:
an ion-carrying electrolyte; and
at least two battery electrodes, wherein at least one battery electrode of the at least two battery electrodes comprises:
a doped substrate comprising a surface configured to face an ion-carrying electrolyte; and
a first diffusivity changing region at a first portion of the surface of the doped substrate, the first diffusivity changing region comprising an amorphized region in the doped substrate, wherein the first diffusivity changing region is configured to change diffusion of ions carried by the electrolyte into the doped substrate, and
a second diffusivity changing region at a second portion of the surface of the doped substrate, the second diffusivity changing region comprising a thermally activated counter-doped region in the doped substrate.

* * * * *